US012200180B2

(12) United States Patent
Kondo

(10) Patent No.: US 12,200,180 B2
(45) Date of Patent: Jan. 14, 2025

(54) PRINTING DEVICE PRINTING PATCH CHART INCLUDING PATCHES FOR SPECIFIED COLORS INCLUDED IN SPECIFIED OBJECT SPECIFIED FROM AMONG OBJECTS IN PRINTING TARGET IMAGE

(71) Applicant: BROTHER KOGYO KABUSHIKI KAISHA, Nagoya (JP)

(72) Inventor: Tomoya Kondo, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/357,391

(22) Filed: Jul. 24, 2023

(65) Prior Publication Data

US 2024/0040064 A1 Feb. 1, 2024

(30) Foreign Application Priority Data

Jul. 26, 2022 (JP) ................. 2022-118420

(51) Int. Cl.
 *H04N 1/60* (2006.01)
(52) U.S. Cl.
 CPC ......... *H04N 1/6033* (2013.01); *H04N 1/6019* (2013.01); *H04N 1/6072* (2013.01); *H04N 1/6094* (2013.01)

(58) Field of Classification Search
 None
 See application file for complete search history.

(56) References Cited

U.S. PATENT DOCUMENTS

2010/0045987 A1* 2/2010 Bonikowski ......... H04N 1/6044
356/402

FOREIGN PATENT DOCUMENTS

JP 2010-157920 A 7/2010
JP 2011-130422 A 6/2011

* cited by examiner

*Primary Examiner* — Thomas D Lee
(74) *Attorney, Agent, or Firm* — Scully, Scott, Murphy & Presser, P.C.

(57) ABSTRACT

A printing device includes: a display; an input unit; a printing engine; and a controller. The display is configured to display a printing target image including a plurality of objects. The input unit is configured to input a specified object specified from among the plurality of objects in the printing target image displayed on the display. The printing engine is configured to print the printing target image on a print medium. The controller is configured to perform: a printing operation. The printing operation is to print a patch chart on at least one sheet of print media with the printing engine. The patch chart includes at least one first patch for at least one specified color and a second patch for a predetermined color. Each of the at least one specified color is a color included in the specified object.

15 Claims, 15 Drawing Sheets

FIG. 1
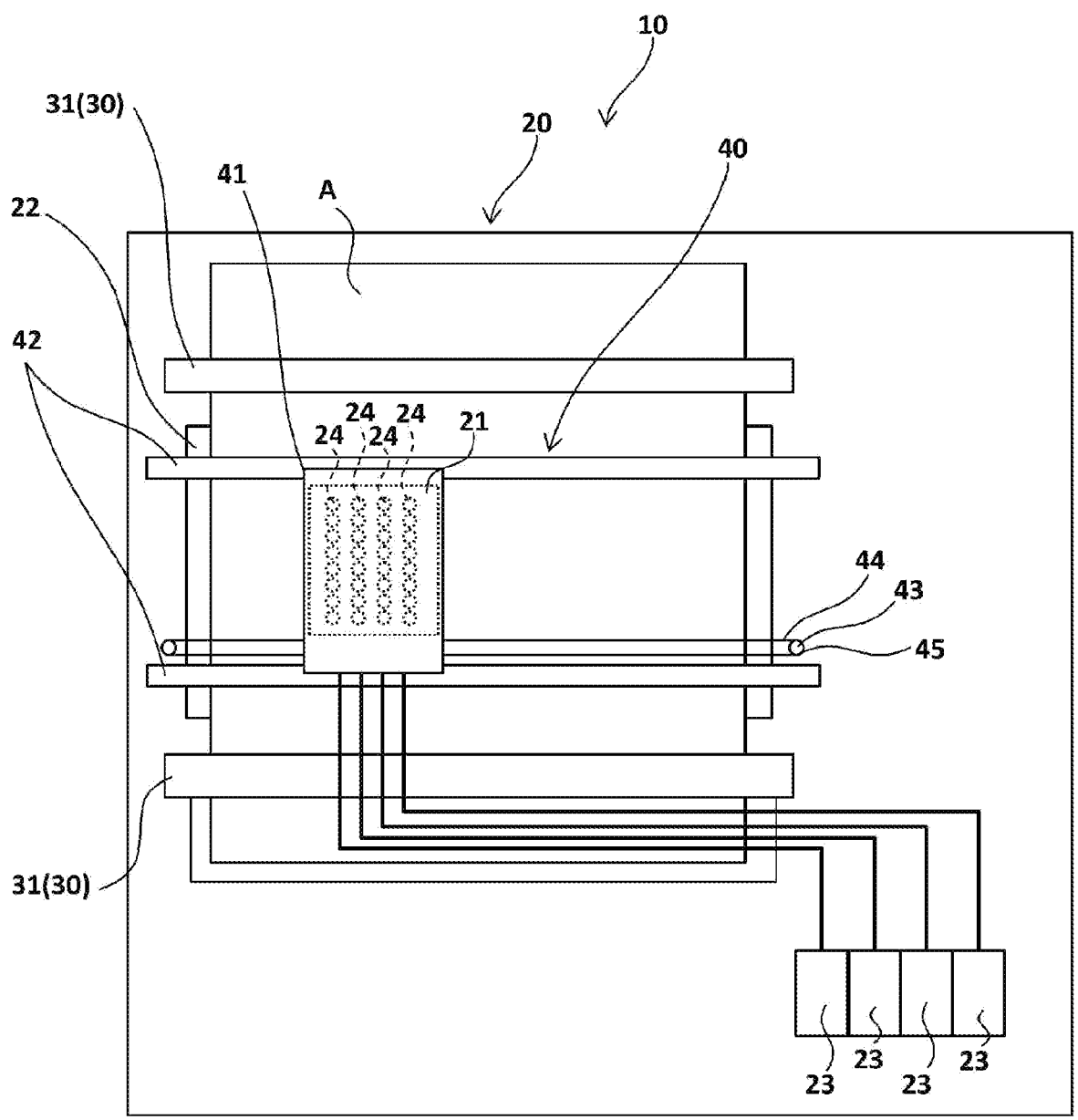
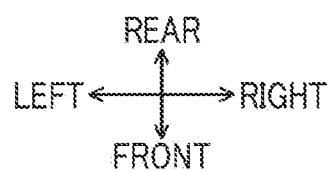

FIG. 4

| No. | SPECIFIED COLOR | | | OCCUPATION AREA | IMPORTANCE LEVEL |
|---|---|---|---|---|---|
| | R | G | B | | |
| 1 | 255 | 176 | 80 | 300 | 1 |
| 2 | 255 | 160 | 80 | 160 | 3 |
| 3 | 128 | 160 | 0 | 200 | 2 |
| .. | .. | .. | .. | .. | .. |

FIG. 5
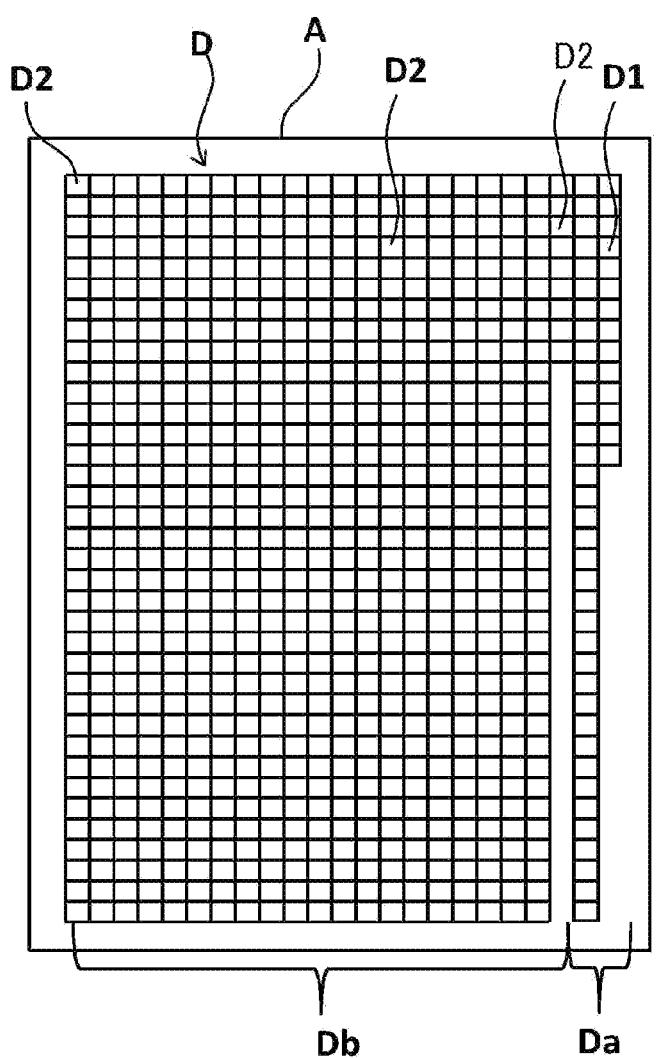
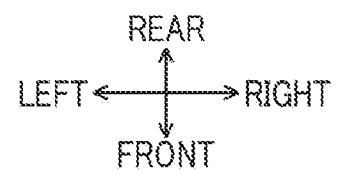

PRINTING DEVICE PRINTING PATCH CHART INCLUDING PATCHES FOR SPECIFIED COLORS INCLUDED IN SPECIFIED OBJECT SPECIFIED FROM AMONG OBJECTS IN PRINTING TARGET IMAGE

REFERENCE TO RELATED APPLICATIONS

This application claims priority from Japanese Patent Application No. 2022-118420 filed on Jul. 26, 2022. The entire content of the priority application is incorporated herein by reference.

BACKGROUND ART

An information processing device described in Japanese Patent Application Publication No. 2010-157920 is one example of a conventional printing device. This information processing device automatically extracts colors represented by printing target data, calculates the occupancy ratio of each color in the printing area, and extracts colors specified by an operator on the basis of the coordinates in the printing target data. The information processing device then prints patch images for calibration based on colors having high occupancy ratios and the colors specified by the operator and performs color calibration on the printing target data on the basis of colorimetric data of the patch images for calibration.

DESCRIPTION

As described above, the conventional information processing device performs color calibration on the printing target data on the basis of colors having high occupancy ratios and colors specified by the operator. However, the operator may be unable to specify an intended color properly and the intended color may not be included among the colors having high occupancy ratios. In such cases, the conventional information processing device is unable to perform color calibration on the printing target data on the basis of the operator's intended colors.

In view of the foregoing, it is an object of the present disclosure to provide a printing device, a method of controlling a printing device, a non-transitory computer-readable storage medium storing a set of computer-readable instructions for controlling a printing device, and a printing system that can perform color calibration suited to the user's intention more appropriately.

In order to attain the above and other object, according to one aspect, the present disclosure provides a printing device. The printing device incudes: a display; an input unit; a printing engine; and a controller. The display is configured to display a printing target image including a plurality of objects. The input unit is configured to input a specified object specified from among the plurality of objects in the printing target image displayed on the display. The printing engine is configured to print the printing target image on a print medium. The controller is configured to perform: a printing operation. The printing operation is to print a patch chart on at least one sheet of print media with the printing engine. The patch chart includes at least one first patch for at least one specified color and a second patch for a predetermined color. Each of the at least one specified color is a color included in the specified object.

According to another aspect, the present disclosure also provides a method of controlling a printing device. The printing device includes: a display; an input unit; and a printing engine. The display is configured to display a printing target image including a plurality of objects. The input unit is configured to input a specified object specified from among the plurality of objects in the printing target image displayed on the display. The printing engine is configured to print the printing target image on a print medium. The method includes: a printing operation. The printing operation is to print a patch chart on at least one sheet of print media with the printing engine. The patch chart includes at least one first patch for at least one specified color and a second patch for a predetermined color. Each of the at least one specified color is a color included in the specified object.

According to still another aspect, the present disclosure also provides a non-transitory computer-readable program storing a set of computer-readable instructions for controlling a printing device. The printing device includes: a display; an input unit; and a printing engine. The display is configured to display a printing target image including a plurality of objects. The input unit is configured to input a specified object specified from among the plurality of objects in the printing target image displayed on the display. The printing engine is configured to print the printing target image on a print medium. The set of computer-readable instructions includes: a printing operation. The printing operation is to print a patch chart on at least one sheet of print media with the printing engine. The patch chart includes at least one first patch for at least one specified color and a second patch for a predetermined color. Each of the at least one specified color is a color included in the specified object.

According to still another aspect, the present disclosure further provides a printing system. The printing system includes: an information processing device; and a printing device. The information processing device includes: a display; an input unit; and a transmission unit. The display is configured to display a printing target image including a plurality of objects. The input unit is configured to input a specified object specified from among the plurality of objects in the printing target image displayed on the display. The transmission unit is configured to transmit information on the specified object inputted through the input unit. The printing device includes: a reception unit; a printing engine; and a controller. The reception unit is configured to receive the information on the specified object transmitted from the transmission unit. The printing engine is configured to print the printing target image on a print medium. The controller is configured to perform: a printing operation. The printing operation is to print a patch chart on at least one sheet of print media with the printing engine. The patch chart includes at least one first patch for at least one specified color and a second patch for a predetermined color. Each of the at least one specified color is a color included in the specified object.

The above configurations can provide a printing device, a method of controlling a printing device, a non-transitory computer-readable storage medium storing a set of computer-readable instructions for controlling a printing device, and a printing system that can perform color calibration suited to the user's intention more appropriately.

The above objects, other objects, features, and advantages of the disclosure will become clear from the following detailed description of embodiments, with reference to the accompanying drawings.

FIG. 1 is a schematic plan view of a printing device.

FIG. 4 is an explanatory diagram illustrating a specified color list.

FIG. 5 is a plan view of a print medium on which a patch chart is printed.

Hereinafter, specific embodiments of the present disclosure will be described while referring to the accompanying drawings. In the following description, the same or corresponding elements are designated with the same reference symbols throughout the drawings.

<Configuration of Printing Device>

Figure 2:
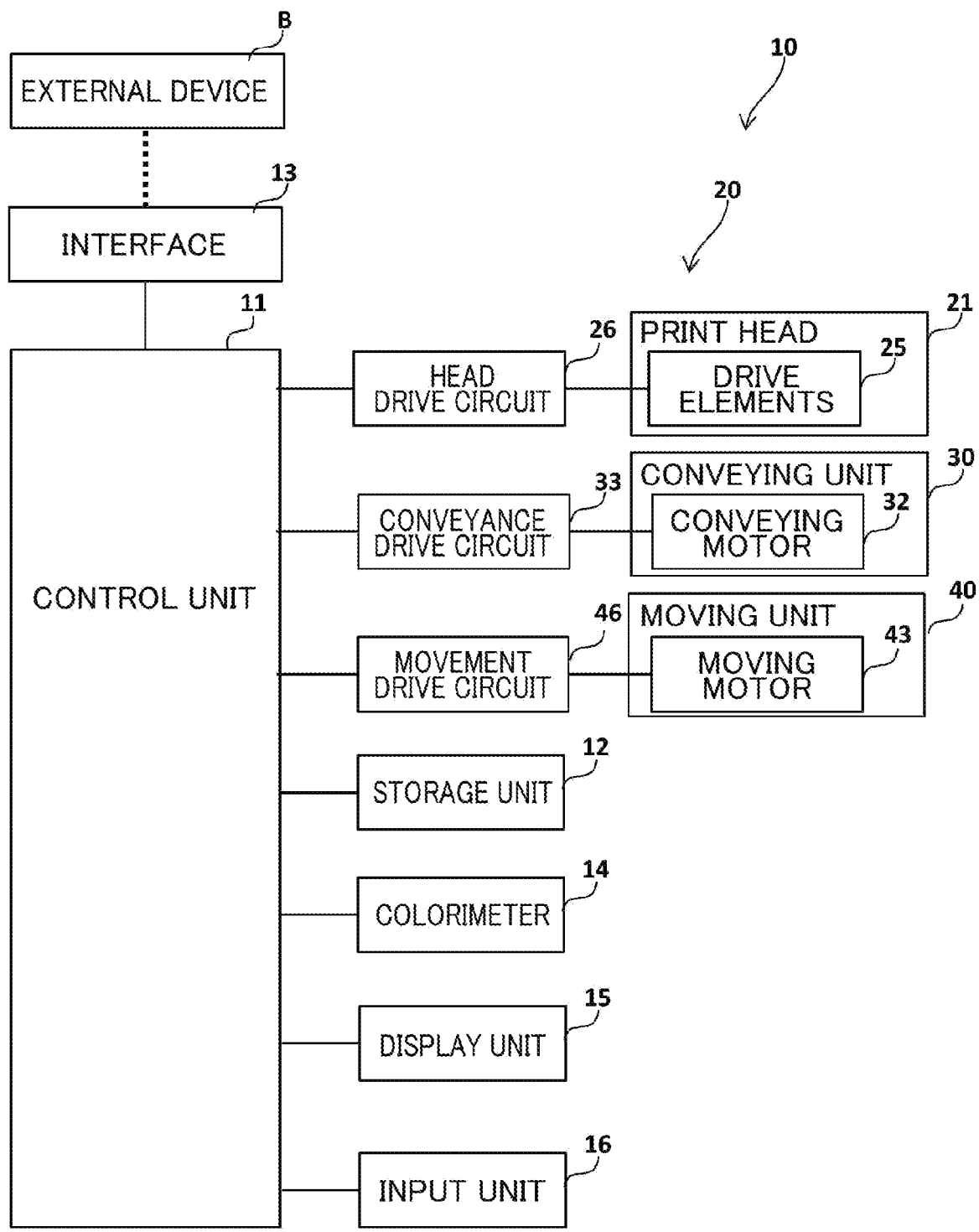
FIG. 2 is a block diagram illustrating the functional configuration of the printing device illustrated in FIG. 1.

FIG. 1 illustrates an example of a printing device 10 according to a first embodiment of the present disclosure. The printing device 10 is provided with a printing engine 20, and prints images on print media A with colorant. An inkjet printer that performs printing with ink is applied as the printing device 10 in the following description.

<Printing Engine>

In the example illustrated in FIG. 1, the printing engine 20 is a serial printer that includes a print head 21, a platen 22, tanks 23, a conveying unit 30, and a moving unit 40. The direction in which the conveying unit 30 conveys the print medium A will be called the front-rear direction. Directions that cross (e.g., orthogonally) the front-rear direction and that cross (e.g., orthogonally) each other will be called the left-right direction and the up-down direction. However, the layout of the printing device 10 is not limited to this example.

The print head 21 has a plurality of nozzles 24 and a plurality of drive elements 25 (see FIG. 2). The nozzles 24 are open in the bottom surface of the print head 21. The drive elements 25 may be piezoelectric elements, heating elements, electrostatic actuators, and the like. The drive elements 25 are provided for respective nozzles 24 in the print head 21 and apply pressure to eject ink from the nozzles 24. The platen 22 has a flat top surface and defines the distance between a print medium A placed on this top surface and the bottom surface of the print head 21 disposed in opposition to this top surface. The tanks 23 store ink to be ejected from the nozzles 24. The example in FIG. 1 shows four tanks 23 that respectively store cyan ink, yellow ink, magenta ink, and black ink. The tanks 23 are connected to the print head 21 via tubes and supply ink to corresponding nozzles 24 via the tubes.

The conveying unit 30 has two conveying rollers 31, and a conveying motor 32 (see FIG. 2), for example. The two conveying rollers 31 are arranged one on either side of the platen 22 in the front-rear direction. The conveying rollers 31 have axes extending in the left-right direction and are coupled to the conveying motor 32. When driven by the conveying motor 32, the conveying rollers 31 rotate about their axes and convey a print medium A in the front-rear direction over the platen 22.

The moving unit 40 has a carriage 41, two guide rails 42, a moving motor 43, and an endless belt 44. The carriage 41 supports the print head 21. The carriage 41 is supported on the two guide rails 42 to be capable of moving in the left-right direction. The two guide rails 42 extend in the left-right direction above the platen 22 with the print head 21 interposed therebetween in the front-rear direction. The endless belt 44 extends in the left-right direction and is attached to the carriage 41. The endless belt 44 is also attached to the moving motor 43 via a pulley 45. When the moving motor 43 is driven, the endless belt 44 circulates and the carriage 41 reciprocates along the guide rails 42 in the left-right direction. In this way, the carriage 41 moves the print head 21 in the left-right direction.

<Control Unit>

As illustrated in the example of FIG. 2, the printing device 10 includes a control unit 11, a storage unit 12, and an interface 13 in addition to the printing engine 20. The control unit 11 is a computer that is electrically connected to the storage unit 12 and interface 13. The interface 13 receives image data and various other data from an external device B, such as a computer, camera, communication network, storage medium, display, or printer, and outputs this data to the control unit 11. The image data is raster data and the like representing an image, such as a printing target image C (see FIG. 3) or a patch chart D (see FIG. 5) described later. The control unit 11 may be configured as a standalone device, or a plurality of devices in a distributed arrangement. In the latter case, the devices interact with each other to control components of the printing device 10.

The storage unit 12 is memory that the control unit 11 can access. The storage unit 12 has RAM and ROM and may also include E2PROM, NVRAM, and the like. The storage unit 12 stores image data, specified colors described later, data acquired or converted by the control unit 11, programs for performing various data processes, information on second patches D2 described later, a conversion table that maps input values to output values, and the like. The programs may also be stored in an external storage medium, such as a CD-ROM, that differs from the storage unit 12 but is accessible by the control unit 11.

The control unit 11 includes a CPU or other processor, as well as an ASIC or other integrated circuit, for example. By executing the programs, the control unit 11 controls the components of the printing device 10 to implement various operations including printing operations. These operations will be described later in detail.

The control unit 11 is electrically connected to the drive elements 25 of the print head 21 via a head drive circuit 26. The control unit 11 outputs control signals for the drive elements 25 to the head drive circuit 26, and the head drive circuit 26 generates and outputs drive signals to the drive elements 25 on the basis of these control signals. When driven according to the drive signals, the drive elements 25 eject ink from corresponding nozzles 24.

The control unit 11 is also electrically connected to the conveying motor 32 of the conveying unit 30 via a conveyance drive circuit 33 for controlling the drive of the conveying motor 32. Accordingly, the control unit 11 controls conveyance of print media A with the conveying unit 30. The control unit 11 is also electrically connected to the moving motor 43 of the moving unit 40 via a movement drive circuit 46 for controlling the drive of the moving motor 43. Accordingly, the control unit 11 controls movement of the print head 21 with the moving unit 40.

<Colorimeter, Display Unit, and Input Unit>

As illustrated in the example of FIG. 2, the printing device 10 includes a colorimeter 14, a display unit 15, and an input unit 16 in addition to the printing engine 20 and the like. The control unit 11 is electrically connected to the colorimeter 14, display unit 15, and input unit 16 and controls the driving of these units. The colorimeter 14 is a spectrophotometer, for example. The colorimeter 14 measures colors in a patch chart D and inputs the colorimetric values from these measurements into the control unit 11. The colorimetric values are expressed as color values, and specifically color coordinates in a device-independent color space, such as Lab values in the L*a*b* color space or XYZ values in the XYZ color space.

The display unit 15 is a display, for example. The display unit 15 displays images, such as a printing target image C that includes a plurality of objects. The input unit 16 is a device that the user operates to input information into the control unit 11. For example, the user may specify one of the plurality of objects in a printing target image C displayed on the display unit 15 to input the specified object into the control unit 11. Examples of the input unit 16 are keys or buttons, a mouse, a touchscreen integrated with the display unit 15. The interface 13 that receives information from the external device B may also function as the input unit.

<Printing Operation>

With the printing device 10 having the above configuration, the control unit 11 acquires image data representing an image such as a printing target image C or a patch chart D and performs a printing operation based on this image data. At this time, the control unit 11 ejects ink from the print head 21 onto a print medium A while moving the print head 21 leftward or rightward, for example. Next, the control unit 11 conveys the print medium A forward. By repeatedly alternating between an operation to move the print head 21 and eject ink and an operation to convey the print medium A in this way, the control unit 11 carries out a printing operation to print an image, such as the printing target image C, on the print medium A with ink.

<Printing Target Image>

Figure 3:
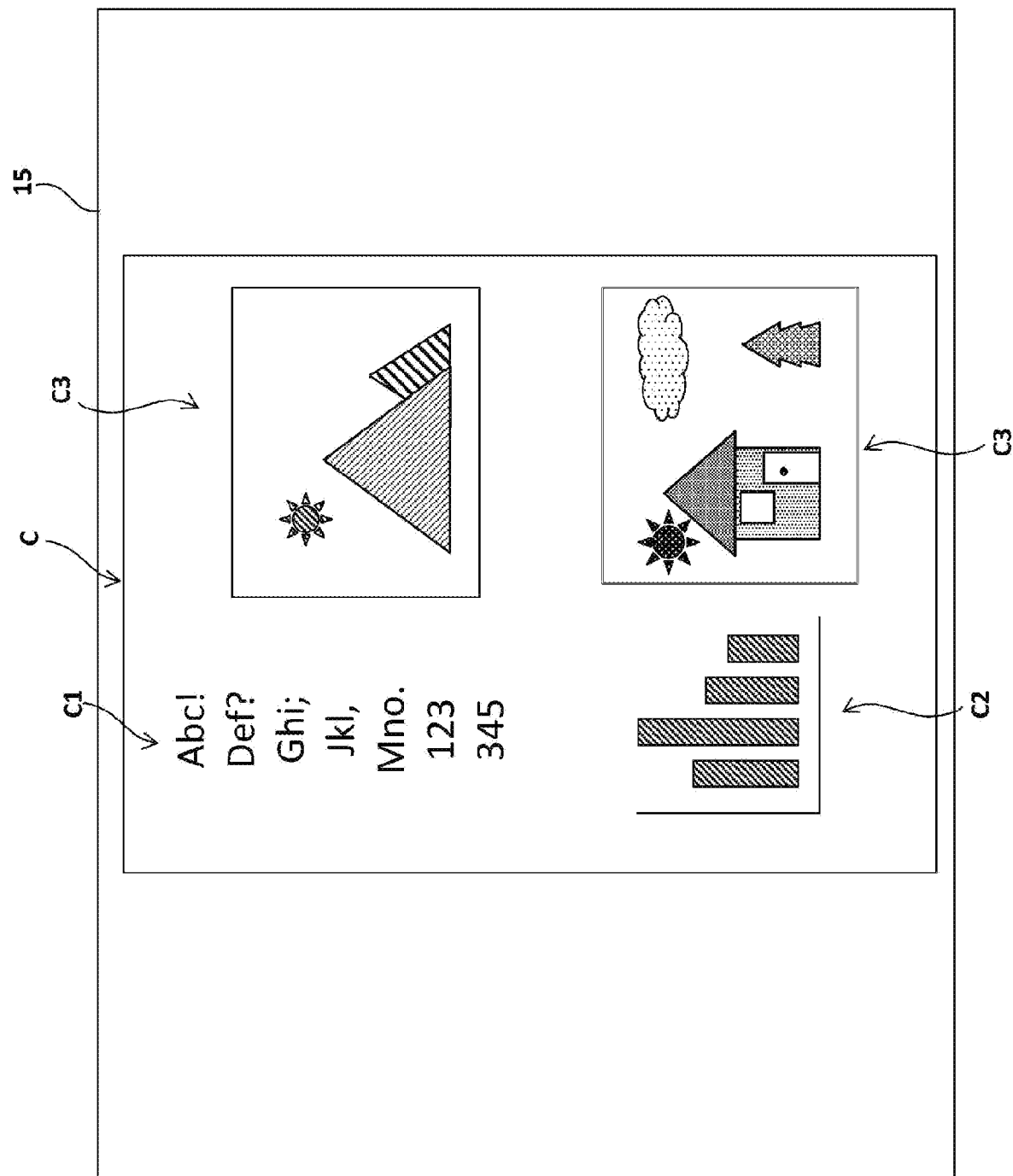
FIG. 3 is an explanatory diagram illustrating a display unit on which a printing target image is displayed.

As illustrated in the example of FIG. 3, the printing target image C includes a plurality of objects. The objects may include a plurality of types of objects that differ from each other. The types of objects include a first object C1, a second object C2, and a third object C3, for example. The printing target image C may include two or more of the first object C1, second object C2, and third object C3 or may include a plurality of objects of the same type.

The first object C1 contains characters, such as letters, numbers, and symbols. In the example of FIG. 3, the first object C1 contains pluralities of characters arranged in rows. The second object C2 contains a figure such as a graph. The third object C3 contains a picture or photograph that contains gradations, for example. The first object C1, second object C2, and third object C3 possess an increasing number of colors in the order given, for example.

The printing target image C is configured of a plurality of pixels. The colors of the pixels constitute image colors of the printing target image C. The user operates the input unit 16 to input one or more of the objects in the printing target image C as specified objects. The image colors of each specified object constitute specified colors. Each of the specified colors is stored in a specified color list in association with an importance level, as illustrated in the example of FIG. 4. The specified color list is stored in the storage unit 12. Here, to acquire or store a specified color means, for example, to acquire or store the color value of the corresponding image color, specifically the color value of the corresponding pixel. In the example of FIG. 4, R, G, and B color values are stored as a specified color.

The importance level of a specified color is defined on the basis of the occupation area of the specified color, the specification order in which the specified object is specified, or a combination of these, for example. The occupation area of the specified color is represented by the number of pixels in the printing target image C having the specified color, for example. In this case, the greater the number of pixels having the specified color, the larger the occupation area of the specified color and the greater the importance level of the specified color. The specification order of a specified object is the order in which the object has been specified when a plurality of objects in the printing target image C have been specified. In this case, the earlier the specification order, the greater the importance level of the specified colors in the specified object.

Figure 6:
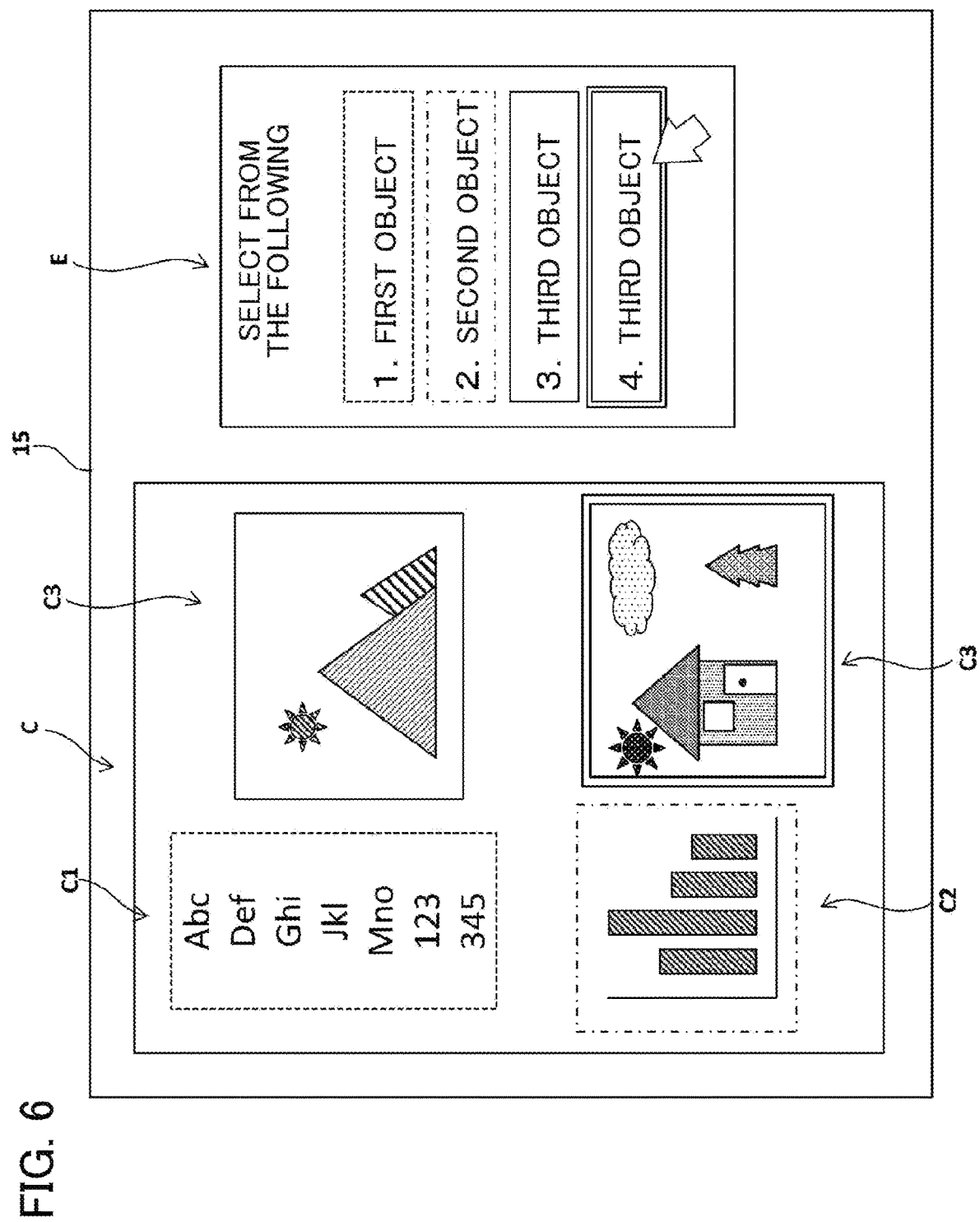
FIG. 6 is an explanatory diagram illustrating the display unit on which an object list is displayed together with the printing target.

In the example of FIG. 6, an object list E is displayed on the display unit 15 together with the printing target image C. The object list E is a list of objects included in the printing target image C. In this example, the printing target image C includes one first object C1, one second object C2, and two third objects C3. Objects in the object list E are associated with objects in the printing target image C by displaying the same borders around corresponding objects on the display unit 15.

Specifically, the first object C1 in the printing target image C and the first object in the object list E of this example are both surrounded by a dashed borderline. The second object C2 in the printing target image C and the second object in the object list E are both surrounded by a border formed of a one-dot chain line. The first (upper) third object C3 in the printing target image C and the first (upper) third object in the object list E are both surrounded by a solid borderline, while the second (lower) third object C3 in the printing target image C and the second (lower) third object in the object list E are surrounded by a double borderline.

The user uses the input unit 16 to specify an object in the object list E displayed on the display unit 15. The object specified with the input unit 16 is inputted into the control unit 11 as a specified object.

<Conversion Table>

To perform a printing operation for printing an image, such as the printing target image C, the control unit 11 uses a conversion table to convert the image data representing the image into a format for printing on the printing device 10, for example. The conversion table is a look-up table that maps input values to output values, for example. The conversion table is stored in the storage unit 12 in advance. The output values are expressed as color values in a predetermined color space for colors that the printing device 10 can print using the colorant provided in the printing device 10, such as CMYK values in the CMYK color space. The output values may also be expressed by color values in a device-dependent color space, such as RGB values in the RGB color space.

The input values are expressed as color values in a predetermined color space, such as RGB values in the RGB color space. For example, the input values are representative values in the color range from an RGB value (0, 0, 0) through an RGB value (255, 255, 255). These representative values are the color values found by dividing a color range of 256 gradations into 17 steps at intervals of 16 gradations for each of the R values, G values, and B values. In this case, the representative values include $(256/16+1)^3=4913$ colors. Thus, input values are provided at intervals of predetermined color differences in the conversion table.

<Patch Chart>

As illustrated in the example of FIG. 5, a patch chart D for performing color calibration on the conversion table includes first patches D1 and second patches D2. The first patches D1 are patches for specified colors included in specified objects and have first colors. The second patches D2 are patches for predetermined colors and have second colors.

The patches are rectangular color chips, for example, having a size that the colorimeter 14 can measure. The size of the patches may be predetermined on the basis of the resolution of the colorimeter 14. Alternatively, the size of the patches may be determined on the basis of the number of patches in the patch chart D, and the size of the printing area on the print medium A available for printing the patch chart D.

The first colors of the first patches D1 in the patch chart D have different color values from each other. The first colors are represented by color coordinates in a device-dependent color space, such as RGB values in the RGB color space. The first colors are some or all of the specified colors included in the specified objects.

The second colors of the second patches D2 in the patch chart D have different color values from each other. The second colors are represented by color coordinates in a device-dependent color space, such as RGB values in the RGB color space. The second colors are color values obtained by dividing a color range of 256 gradations into 9 steps at intervals of 32 gradations for each of the R values, G values, and B values. Thus, the second colors include $(256/32+1)^3=729$ different colors, which are the same colors as some of the input values in the conversion table. Since the second colors are stored in the storage unit 12 in advance, information on the second patches D2 is stored in the storage unit 12.

The patch chart D has a first patch area Da and a second patch area Db. The first patches D1 are arranged in the first patch area Da and the second patches D2 are arranged in the second patch area Db. For example, the patch chart D may be divided into two areas: the second patch area Db and the first patch area Da. In this case, the second patch area Db and first patch area Da may each be a single closed area and may be arranged side by side in the left-right direction or the front-rear direction.

The patch chart D is printed on a single sheet or a plurality of sheets of print media A, depending on the number of patches. When the number of patches is few, both the first patch area Da and the second patch area Db may fit on a single sheet of print media A, as in the example of FIG. 5. When the number of patches is great, the patch chart D may extend across a plurality of sheets of print media A, and the first patch area Da and second patch area Db are each arranged on at least one sheet of the print media A.

<Method of Controlling the Printing Device>

Figure 7:
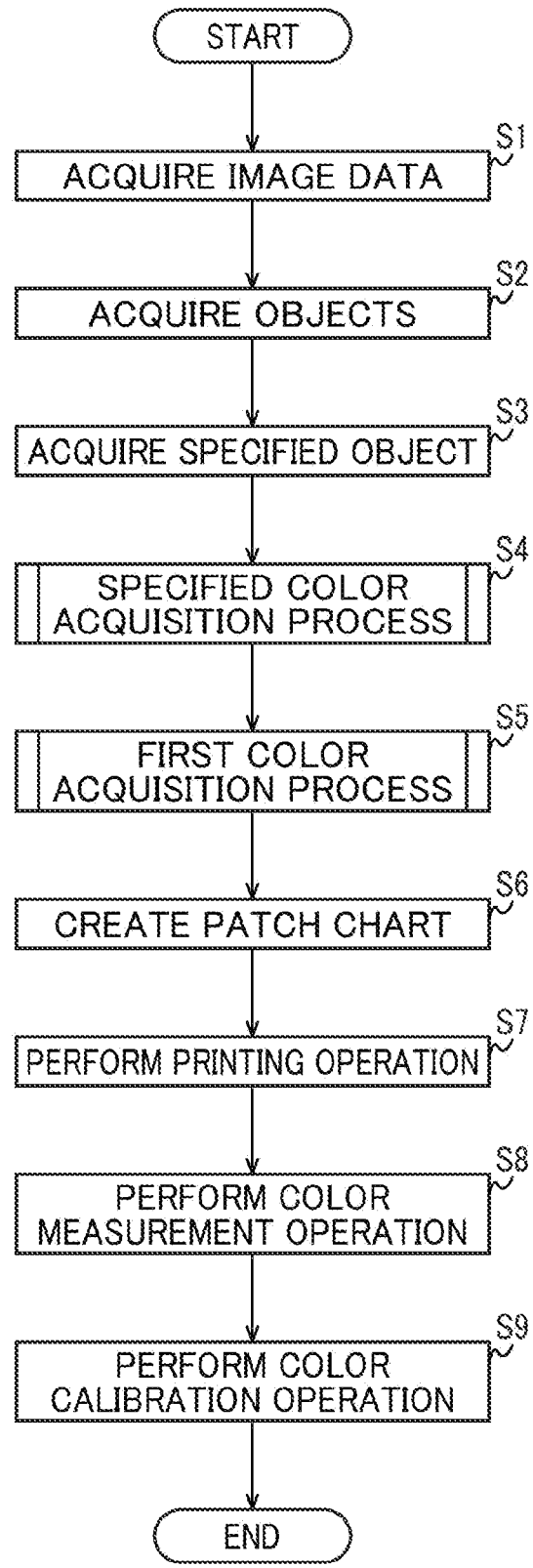
FIG. 7 is a flowchart illustrating steps in an example of a method of controlling the printing device that is executed by a control unit of the printing device.

FIG. 7 is a flowchart illustrating steps in an example of a method of controlling the printing device 10 that is executed by the control unit 11. The control unit 11 executes the steps according to this flowchart when image data is received from the external device B via the interface 13. In S1 at the beginning of the process, the control unit 11 acquires image data representing the printing target image C from the external device B.

In S2 the control unit 11 performs a well-known image process such as shape analysis on the image data representing the printing target image C to extract objects from the printing target image C. Specifically, the control unit 11 acquires the type and position of each object in the printing target image C on the basis of the image data.

Next, the control unit 11 displays the printing target image C with a corresponding object list E on the display unit 15, as illustrated in the example of FIG. 6. At this time, the user operates the input unit 16 to specify objects in the object list E. In S3 the control unit 11 acquires objects specified via the input unit 16 as specified objects. Thus, the control unit 11 acquires one or more specified objects.

Figure 8:
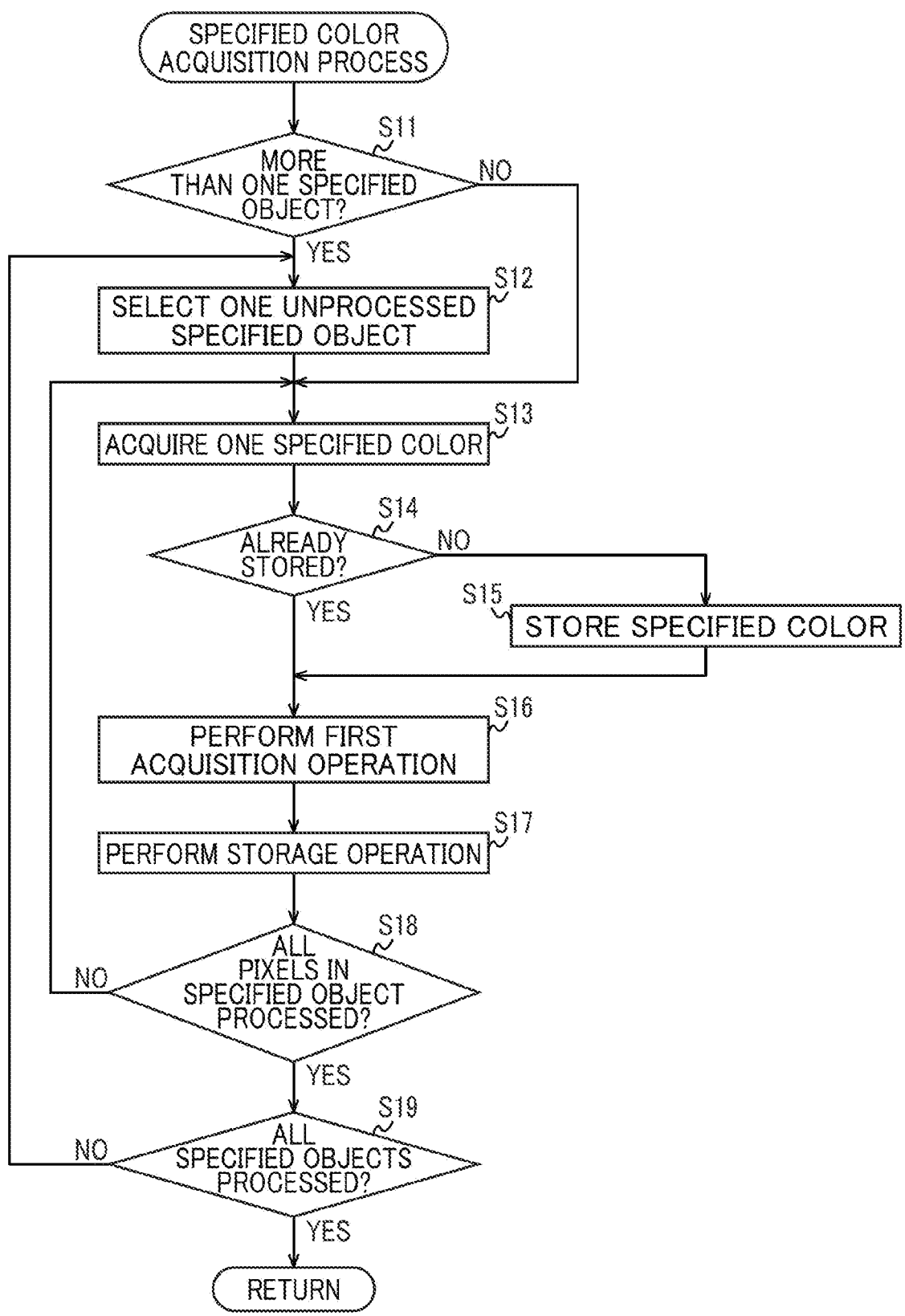
FIG. 8 is a flowchart illustrating steps in an example of a specified color acquisition process executed in the process illustrated in FIG. 7 and in the process illustrated in FIG. 13.

In S4 the control unit 11 acquires the specified colors of the specified objects. FIG. 8 is a flowchart illustrating steps in an example of a specified color acquisition process according to which the control unit 11 acquires these specified colors. In S11 of this flowchart, the control unit 11 determines whether more than one specified object has been inputted via the input unit 16. When a plurality of specified objects has been inputted (S11: YES), in S12 the control unit 11 selects one specified object from among the specified objects that have not yet been processed and performs the process from S13 on the selected specified object. However, when only one specified object has been inputted (S11: NO), the control unit 11 performs the process from S13 on this specified object.

In S13 the control unit 11 designates one unprocessed pixel from the pixels included in the specified object and acquire an image color of the designated pixel as a specified color. In S14 the control unit 11 determines whether this specified color has already been stored in the specified color list of the storage unit 12. When the specified color has not yet been stored in the specified color list (S14: NO), in S15 the control unit 11 stores the specified color in the specified color list illustrated in the example of FIG. 4. In S16 the control unit 11 then performs a first acquisition operation. On the other hand, when the control unit 11 determines in S14 that the specified color has already been stored in the specified color list (S14: YES), the control unit 11 advances to S16 to perform the first acquisition operation.

In the first acquisition operation of S16, the control unit 11 acquires the importance level defined for the specified color. For example, when the importance levels of specified colors are defined on the basis of the occupation area, the control unit 11 increases the occupation area that indicates the number of pixels of the specified color and is stored in association with the specified color in the specified color list by one and acquires an importance level corresponding to this increased (updated) occupation area. Note that the initial value of the occupation area is zero. In S17 the control unit 11 performs a storage operation to store the specified color and importance level in the storage unit 12 in association with each other. More specifically, in the storage operation, the control unit 11 updates the importance level stored in association with the specified color in the specified color list.

In S18 the control unit 11 determines whether the process from S13 has been performed on all pixels constituting the specified object. When there remain any pixels in the specified object that have not undergone the process form S13, the control unit 11 returns to S13, designates one of the unprocessed pixels and acquires an image color of the designated pixel as a specified color, and performs the process in S14 through S17 on the specified color. In this way, the process in S15 through S17 is performed sequentially on all pixels and all specified colors in one specified object.

Once the above process has been completed for all pixels in the specified object (S18: YES), in S19 the control unit 11 determines whether all specified objects in the printing target image C have been processed. When there remain specified objects that have not undergone the process from S13 (S19: NO), the control unit 11 returns to S12, acquires one of the unprocessed specified objects, and performs the process in S13 through S18 on that specified object. Once all specified objects in the target image C have undergone the process in S13 through S18 as described above (S19: YES), the control unit 11 has acquired a specified color list including all specified colors, i.e., the control unit 11 has acquired all the specified colors, and returns to the process in FIG. 7.

Thus, when a plurality of image colors is included in one specified object or a plurality of specified objects has been inputted, the control unit 11 acquires importance levels for all specified colors in each specified object and stores these importance levels in the storage unit 12 in the storage operation. More specifically, in the storage operation, the control unit 11 stores the importance levels in association with the specified colors in the specified color list stored in the storage unit 12, or updates the importance levels stored in association with the specified colors in the specified color list in the storage unit 12. The second object C2 and third object C3 are specified objects that may include the same specified color (e.g., blue), for example. In this case, the sum of the number of blue pixels included in the second object C2 and the number of blue pixels included in the third object C3 is stored as the occupation area of this blue color in the specification color list. The importance level for this blue color is defined on the basis of the occupation area of the blue color and is stored in the specified color list, where the importance level is increasingly higher for larger occupation areas.

Figure 9:
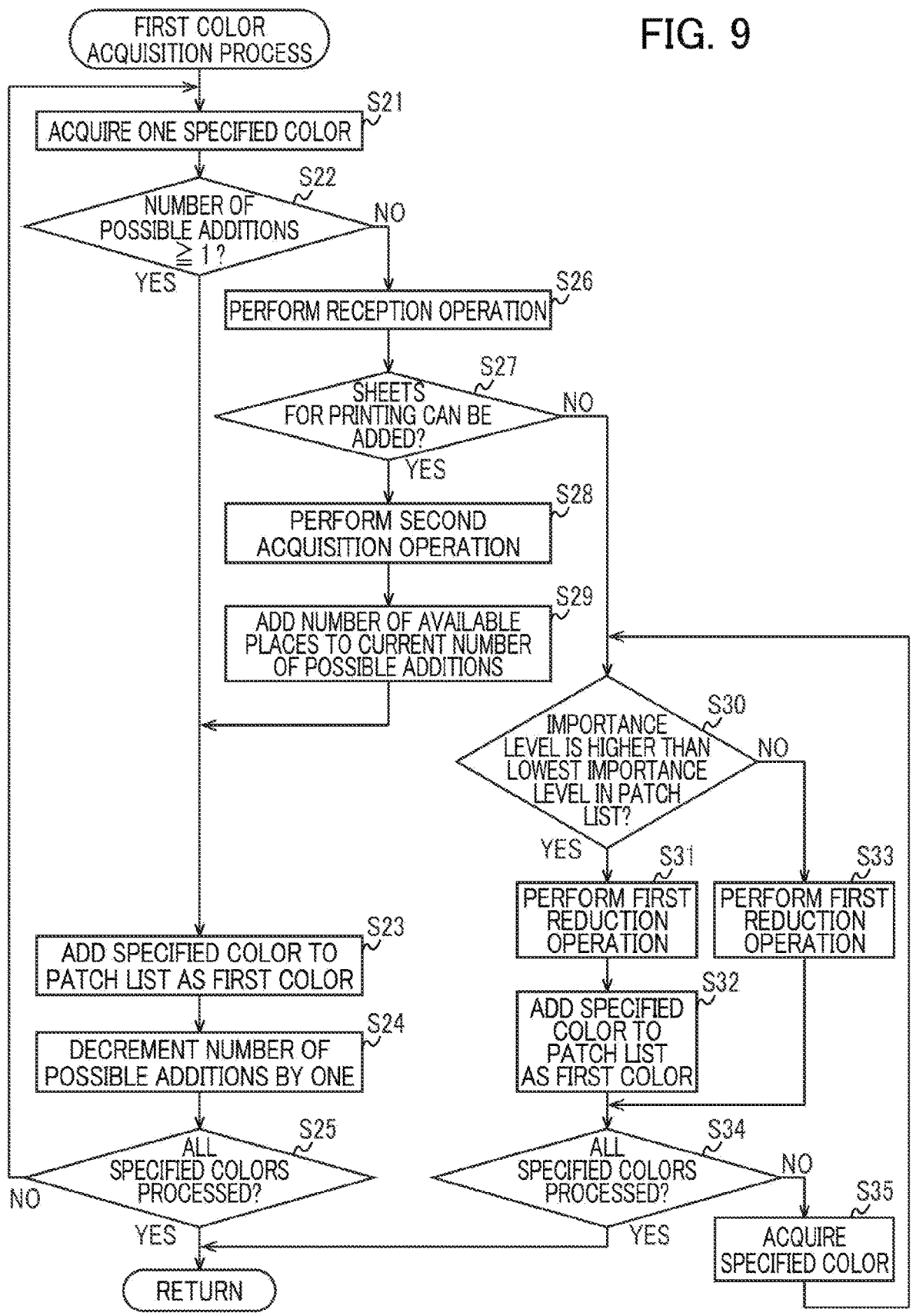
FIG. 9 is a flowchart illustrating steps in an example of a first color acquisition process executed in the process illustrated in FIG. 7.

Returning to the process in FIG. 7, in S5 the control unit 11 acquires the first colors of first patches D1 from the specified colors included in the specified color list acquired in S4. FIG. 9 is a flowchart illustrating steps in an example of a first color acquisition process according to which the control unit 11 acquires these first colors. When there is a large number of specified colors, the number of first patches D1 having first colors based on these specified colors may increase and the area required to print the patch chart D including these first patches D1 may exceed the printable area of a sheet of print media A. Therefore, the control unit 11 acquires all specified colors in the specified color list as the first colors when there are few specified colors and acquires some of the specified colors in the specified color list as first colors when there are many specified colors.

Hence, in S21 of FIG. 9 the control unit 11 first acquires one specified color from the specified color list. In S22 the control unit 11 determines whether the number of first colors that can be added to a patch list is at least one. The patch list is a list of first colors for first patches D1 arranged in the patch chart D and the importance levels of those first colors.

Hereinafter, the number of first colors that can be added to a patch list is also referred to as the number of possible additions for first colors.

The number of possible additions for first colors corresponds to the number of additional first patches D1 that can be arranged in the patch chart D to be printed on the print media A, i.e., the number of the available places for first patches D1. The initial number of possible additions for first colors is the number of available places for first patches D1 in the patch chart D to be printed on a prescribed number of print media A (e.g., one sheet). For example, the number of available places for first patches D1 may be the quotient obtained when dividing the area of the first patch area Da by the area of a first patch D1. A greater number of available sheets of print media A available for printing the patch chart D increases the number of possible additions for first colors of first patches D1 by increasing the number of available places for first patches D1 in the patch chart D. The number of available places for first patches D1 on one sheet of print media A, i.e., the number of possible additions for first colors is set on the basis of the printing area of the print media A, the area of a first patch D1 and the area of a second patch D2, and the number of second patches D2. These values may be predetermined or may be inputted by the user.

When the number of possible additions for first colors (the number of first colors that can be added) is one or more (S22: YES), in S23 the control unit 11 adds the specified color acquired in S21 to the patch list as a first color. The control unit 11 also acquires the importance level of that specified color from the specified color list as the importance level of the first color and adds this importance level to the patch list in association with that first color. In S24 the control unit 11 decrements the number of possible additions by one and in S25 determines whether all specified colors in the specified color list have been processed. If all specified colors in the specified color list have been processed at this time (S25: YES), the control unit 11 returns to S5 in FIG. 7.

However, while there remain unprocessed specified colors in the specified color list (S25: NO), in S21 the control unit 11 acquires another specified color from the specified color list and repeats the process from S22 on that unprocessed specified color. While repeating this process, the number of first colors in the patch list, i.e., the number of first patches D1 may reach the number of available places for first patches D1 in a patch chart D printed on one sheet of print media A, for example. At this time, the control unit 11 determines in S22 that the number of possible additions for first colors is less than 1 (S22: NO), and advances to S26.

In S26 the control unit 11 performs a reception operation to receive through the input unit a number of sheets to be printed, which is the number of sheets of print media A on which the patch chart D is to be printed. In this reception operation, the control unit 11 may prompt the user to input on the input unit 16 whether sheets of print media A can be added for printing the patch chart D or to input on the input unit 16 the number of sheets of print media A that can be added. Hereinafter, the number of sheets of print media A that can be added is also referred to as the number of additional sheets of print media A. After performing the reception operation, in S27 the control unit 11 determines whether sheets for printing can be added.

When the user indicates that print media A can be added or that the number of additional sheets of print media A is one or more in the reception operation of S26, the control unit 11 determines at this time that sheets for printing can be added (S27: YES), and in S28 performs a second acquisition operation to acquire the number of first patches D1 that can be placed in a patch chart D on the basis of the number of sheets of print media A. In other words, the control unit 11 performs the second acquisition operation to acquire a number of candidate places for one or more first patches on the basis of the number of sheets indicated by the user. When the user indicates that sheets of print media A can be added, for example, the control unit 11 acquires the number of first patches D1 that can be arranged on one additional sheet of print media A. Furthermore, when the user inputs a number of additional sheets of print media A, the control unit 11 acquires the number of available places for first patches D1 on the print media A for the number of additional sheets. In S29 the control unit 11 then adds the number of available places for first patches D1 to the current number of possible additions for first colors to set a new number of possible additions for first colors. Next, in S23 the control unit 11 adds the specified color to the patch list as a first color, together with the importance level of the specified color, and in S24 decrements the number of possible additions by one.

On the other hand, when the user indicates that no print media A can be added for printing the patch chart D or when the user inputs "0" as the number of additional sheets of print media A that can be added for printing the patch chart D in the reception operation of S26, the control unit 11 determines that there are no additional sheets for printing (S27: NO). Thus, in S30 the control unit 11 acquires the importance level of the specified color acquired in S21 from the specified color list and compares the importance level of this specified color with the lowest importance level in the patch list.

When the importance level of this specified color is higher than the lowest importance level in the patch list (S30: YES), in S31 the control unit 11 performs a first reduction operation to reduce the number of specified colors to be used as the first colors for the first patches D1 by excluding the first color corresponding the lowest importance level from the patch list. The first reduction operation is performed when the number of specified colors is greater than the available places for first patches D1 in the patch chart D, and is to reduce the number of specified colors by excluding a specific specified color from among the specified colors. Here, the specific specified color corresponds to the lowest importance level among the importance levels of the specified colors, and more specifically, the specific specified color is one of the current specified color and the first color corresponding the lowest importance level, whose importance level is lower than the other one's importance level. In this first reduction operation, the control unit 11 deletes from the patch list the first color having the lowest importance level, which is lower than the importance level of the current specified color. In S32 the control unit 11 adds this specified color to the patch list as a first color together with its importance level.

On the other hand, when the control unit 11 determines in S30 that the importance level of the specified color is not higher than the lowest importance level in the patch list (S30: NO), in S33 the control unit 11 performs the first reduction operation. In the first reduction operation performed in S33, the control unit 11 reduces the number of specified colors by excluding the current specified color from the specified colors to be used as the first colors for the first patches D1 without adding the current specified color to the patch list since this specified color has a lower importance level than the lowest importance level in the patch list.

In S34 the control unit 11 determines whether all specified colors in the specified color list have been processed. If there remain unprocessed specified colors in the specified color list (S34: NO), in S35 the control unit 11 acquires an unprocessed specified color from the specified color list and repeats the above process from S30 on that specified color. However, if all specified colors in the specified color list have been processed (S34: YES), the control unit 11 returns to the process of FIG. 7.

After acquiring the first colors in S5 as described above, in S6 the control unit 11 creates a patch chart D. Here, the control unit 11 acquires the first colors from the patch list. The control unit 11 also acquires predetermined colors that have been stored in the storage unit 12 in advance as second colors. Next, the control unit 11 generates image data representing a patch chart D that includes first patches D1 having the first colors and second patches D2 having the second colors.

Here, the control unit 11 may arrange the first patches D1 in the patch chart D in order of importance level defined for their first colors. Accordingly, the first patches D1 are arranged in the patch chart D in descending order of their importance levels in the printing target image C. For example, rows of first patches D1 aligned in the front-rear direction are arranged from the rear toward the front in order of first patches D1 having a higher importance level. Columns of first patches D1 are further arranged from left to right in order of columns of first patches D1 having a higher importance level.

In S7 the control unit 11 performs a printing operation to print on print media A the patch chart D that includes first patches D1 for the specified colors included in the specified objects and second patches D2 for the predetermined colors with the printing engine 20. In the printing operation, the control unit 11 prints the patch chart D on print media A on the basis of the image data representing the patch chart D. Here, when the color values in the image data are defined by RGB values, the control unit 11 converts the image data using the conversion table and prints the patch chart D on the print media A on the basis of the converted image data.

In S8 the control unit 11 performs a color measurement operation to control the colorimeter 14 to measure the colors of first patches D1 and second patches D2 in the patch chart D printed on the print media A. Through this color measurement operation, the control unit 11 acquires colorimetric values for the first patches D1 and second patches D2. Next, the control unit 11 associates the Lab values for the colorimetric values of first patches D1 with the RGB values of the first colors, associates the Lab values for the colorimetric values of second patches D2 with the RGB values of the second colors, and stores these associations in the storage unit 12 as patch information.

In S9 the control unit 11 performs a color calibration operation to make color calibration on the conversion table on the basis of the colors measured in the color measurement operation. In this color calibration operation, the control unit 11 calibrates output values in the conversion table on the basis of the patch information and stores the calibrated conversion table in the storage unit 12. Following step S9, the control unit 11 may print the printing target image C using the calibrated conversion table. In this case, the control unit 11 uses the calibrated conversion table to convert the image data representing the printing target image C and prints the printing target image C on the print media A on the basis of the converted image data. Through this process, colors in the printed printing target image C have been calibrated on the basis of the specified colors in the specified objects inputted by the user. Thus, when the user specifies an object in this way, color calibration is performed on the basis of the specified colors in this object, enabling the control unit 11 to perform color calibration suited to the user's intention more appropriately.

<First Variation>

In the printing device 10 according to a first variation, when the specified objects include an object containing a picture or a photograph, the printing device 10 performs a second reduction operation to reduce the number of specified colors by performing a pixel reduction on that specified object and setting colors included in the specified object after the pixel reduction as specified colors. Specifically, the printing device 10 reduces the number of pixels constituting the specified object from the original number of pixels and sets colors included in the specified object as specified colors after the number of pixels has been reduced.

Figure 10:
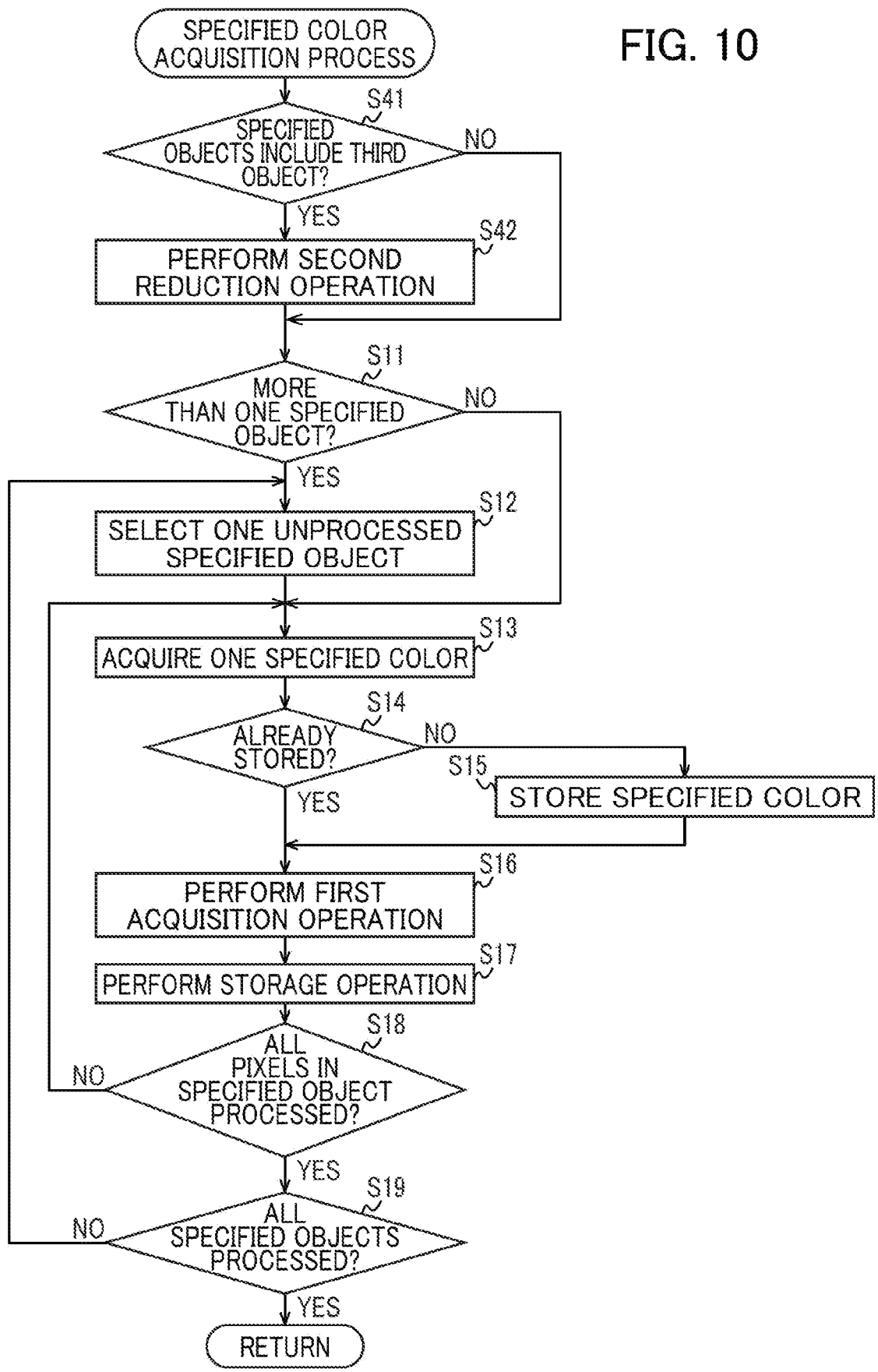
FIG. 10 is a flowchart illustrating steps in another example of the specified color acquisition process executed in the process illustrated in FIG. 7.

FIG. 10 is a flowchart illustrating steps in another example of the specified color acquisition process in which the second reduction operation is performed by the control unit 11. In the flowchart of FIG. 10, a process in steps S41 and S42 is executed prior to the process of S11 in the flowchart of FIG. 8.

Specifically, in S41 the control unit 11 determines whether the specified objects include a third object C3. A third object C3 is a picture or photograph that normally includes more image colors than first objects C1 and second objects C2. Therefore, when the specified objects include a third object C3 (S41: YES), in S42 the control unit 11 performs the second reduction operation since the number of specified colors would be greater than the number of available places in the patch chart D for first patches D1.

As an example of the second reduction operation, the control unit 11 reduces the size of the image data representing the printing target image C. The number of pixels in the printing target image C following this size reduction is less than the original number of pixels prior to reduction. Therefore, the number of image colors, which are the colors of pixels, is reduced to a lower number than the original number of image colors prior to reduction, and the number of specified colors is reduced to a number lower than the number of specified colors prior to reduction. In this way, the control unit 11 reduces the number of specified colors. Next, the control unit 11 performs the process from S11 on the specified colors remaining after this reduction.

However, when the specified objects include no third objects C3 (S41: NO), the control unit 11 performs the process from S11 on specified colors in the specified objects acquired in S3 without performing the second reduction operation. Accordingly, by performing the second reduction operation on specified objects specified by the user, the control unit 11 can perform color calibration suited to the user's intention more appropriately while reducing processing time.

The second reduction operation is not limited to a method for reducing the size of the image data representing the printing target image C. For example, the control unit 11 may perform a second reduction operation to reduce the resolution of the printing target image C. This reduction of resolution reduces the number of pixels in the printing target image C from the original number of pixels prior to reduction. Therefore, the number of image colors, which are the colors of pixels, is reduced to a number less than the number of image colors prior to reduction, and the number of specified colors is reduced to a number lower than the number of specified colors prior to reduction. In this way, the control unit 11 reduces the number of specified colors.

The control unit 11 may also perform the reception operation and the second acquisition operation between steps S41 and S42. In this case, when the specified objects include a third object C3 (S41: YES), the control unit 11 receives the number of sheets of print media A on which the patch chart D is to be printed and acquires the number of available places for first patches D1 in the patch chart D on the basis of the number of sheets of print media A. Next, the control unit 11 acquires the number of specified colors in the specified objects on the basis of the image data and in S42 performs the second reduction operation when the number of specified colors is greater than the number of available places for first patches D1. The control unit 11 may also execute the process in S42 after performing the reception operation and the second acquisition operation in place of the process in S41.

<Second Variation>

The printing device 10 according to a second variation is also provided with the storage unit 12 that stores the conversion table as in the first embodiment and first variation. The conversion table has a plurality of input values at intervals of predetermined color differences in a predetermined color space. In other words, in the conversion table, any two neighboring input values of the plurality of input values are spaced apart at a predetermined color difference in the predetermined color space. When the specified objects include an object containing a picture or a photograph and a plurality of the specified colors is positioned between two neighboring input values spaced apart at the predetermined color difference, the control unit 11 performs a third reduction operation to reduce the number of specified colors. In this third reduction operation, the control unit 11 excludes specified colors between the two input values other than the closest specified color closest to an intermediate value G3.

Figure 11:
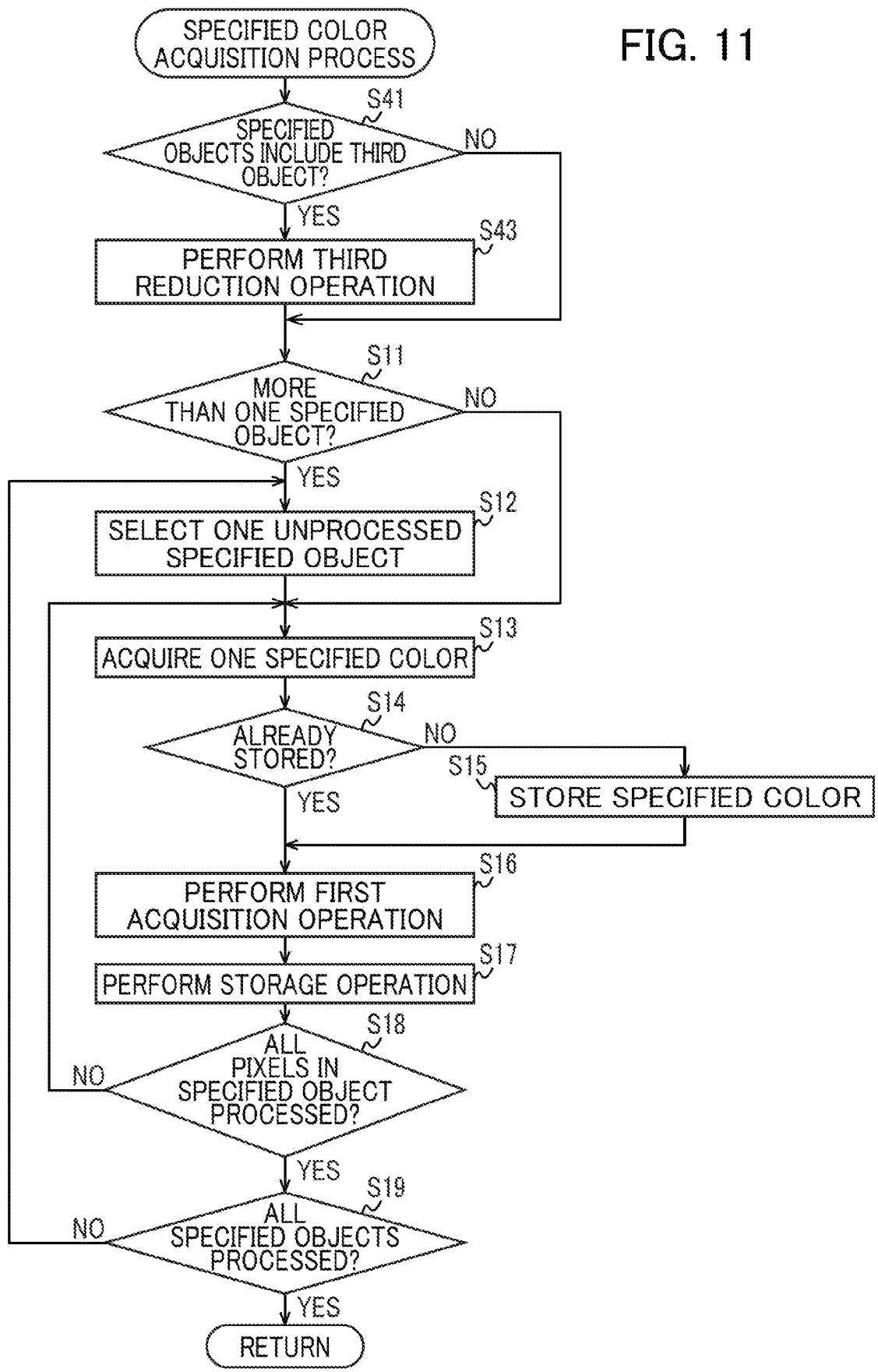
FIG. 11 is a flowchart illustrating steps in another example of the first color acquisition process executed in the process illustrated in FIG. 7.

FIG. 11 is a flowchart illustrating steps in still another example of the specified color acquisition process in which the third reduction operation is performed by the control unit 11. In the flowchart of FIG. 11, a process in step S43 is executed in place of S42 in the flowchart of FIG. 10. Note that the control unit 11 may execute the process in S42 and S43 following step S41.

Specifically, in S41 of FIG. 11 the control unit 11 determines whether the specified objects include a third object C3. When the specified objects include a third object C3 (S41: YES), in S43 the control unit 11 performs the third reduction operation since the number of specified colors would be greater than the number of first patches D1 that can be arranged in the patch chart D.

For example, the conversion table has a plurality of input values spaced apart at a predetermined color difference. Third objects C3 such as pictures or photographs generally have gradations. In such cases, a third object C3 has a plurality of specified colors whose color differences are smaller than the predetermined color difference. Consequently, more than one specified color in the third object C3 may be positioned between two neighboring input values spaced apart at the predetermined color difference.

Figure 12:
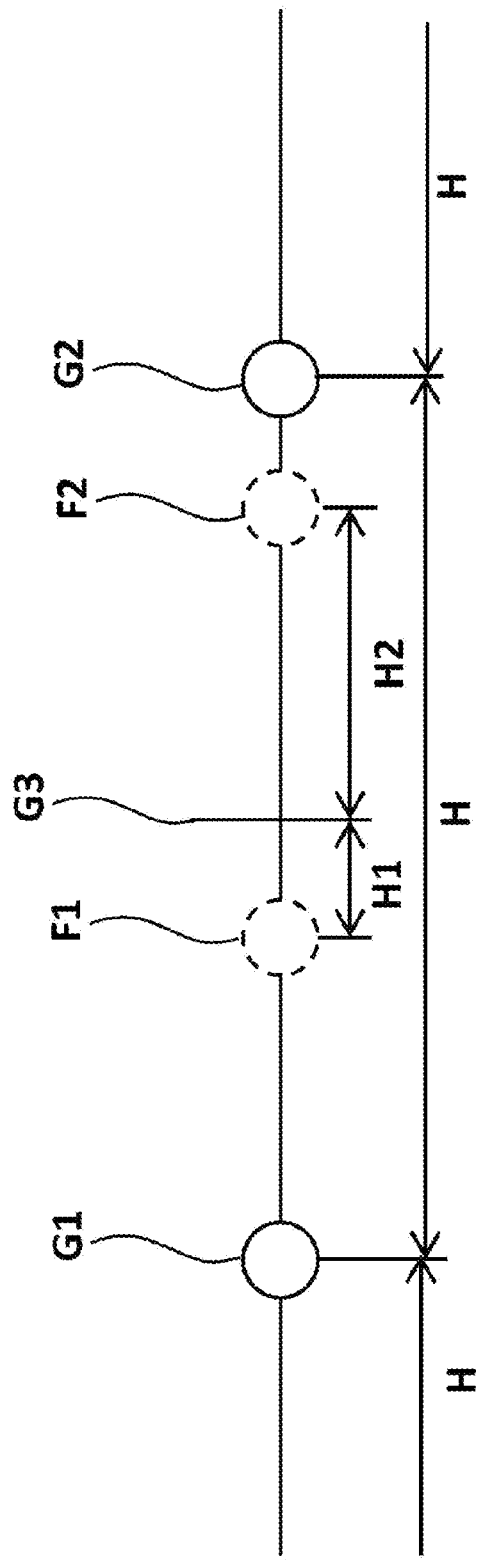
FIG. 12 is an explanatory diagram illustrating a third reduction operation performed in the first color acquisition process illustrated in FIG. 11.

FIG. 12 illustrates an example in which a first specified color F1 and a second specified color F2 are positioned between a first input value G1 and a second input value G2 spaced apart by a predetermined color difference H. In this case, the control unit 11 acquires the first input value G1 and second input value G2 from the conversion table and acquires the intermediate value G3 between the first input value G1 and second input value G2. Next, the control unit 11 acquires the first specified color F1 and second specified color F2 from the image data representing the printing target image C and acquires a first color difference H1 between the intermediate value G3 and first specified color F1 and a second color difference H2 between the intermediate value G3 and second specified color F2. Since the first color difference H1 is shorter than the second color difference H2 in this example, the control unit 11 determines that the first specified color F1 is closer to the intermediate value G3 than the second specified color F2 is to the intermediate value G3 and excludes the second specified color F2 from the specified colors while leaving the first specified color F1 in the specified colors. In this way, the control unit 11 reduces the number of specified colors.

The control unit 11 then performs the process from S11 on the specified colors remaining after this reduction. On the other hand, when the specified objects include no third objects C3 (S41: NO), the control unit 11 performs the process from S11 on all specified colors in the specified objects acquired in S3 without performing the third reduction operation. By performing the third reduction operation on the specified objects specified by the user, the control unit 11 can perform color calibration suited to the user's intention more appropriately while reducing processing time.

Note that the control unit 11 may perform the reception operation and the second acquisition operation between steps S41 and S43. In this case, when the specified objects include a third object C3 (S41: YES), the control unit 11 receives the number of sheets of print media A on which the patch chart D is to be printed and acquires the number of available places for first patches D1 in the patch chart D on the basis of the number of sheets of print media A. Next, the control unit 11 acquires the number of specified colors in the specified objects on the basis of the image data and in S43 performs the third reduction operation when the number of specified colors is greater than the number of available places for first patches D1. The control unit 11 may also perform the process in S43 after performing the reception operation and the second acquisition operation in place of the process in S41.

In the printing device 10 according to a second embodiment, objects include a plurality of different types of objects. The control unit 11 performs a third acquisition operation to acquire an upper limit for the number of first patches D1 in the patch chart D on the basis of the types of objects. Here, the upper limit for the number of first patches D1 in the patch chart D may differ on the basis of the types of objects. Hereinafter, the upper limit for the number of first patches D1 is also referred to as the upper limit value of first patches D1.

For example, the types of objects include first objects C1 containing characters and second objects C2 containing figures. The upper limit value of first patches D1 in the patch chart D for second object C2 is greater than the upper limit value of first patches D1 for first objects C1.

Furthermore, the types of objects include second objects C2 containing figures and third objects C3 containing pictures or photographs. In the patch chart D, the upper limit value of first patches D1 for third objects C3 is greater than the upper limit value of first patches D1 for second objects C2.

Figure 13:
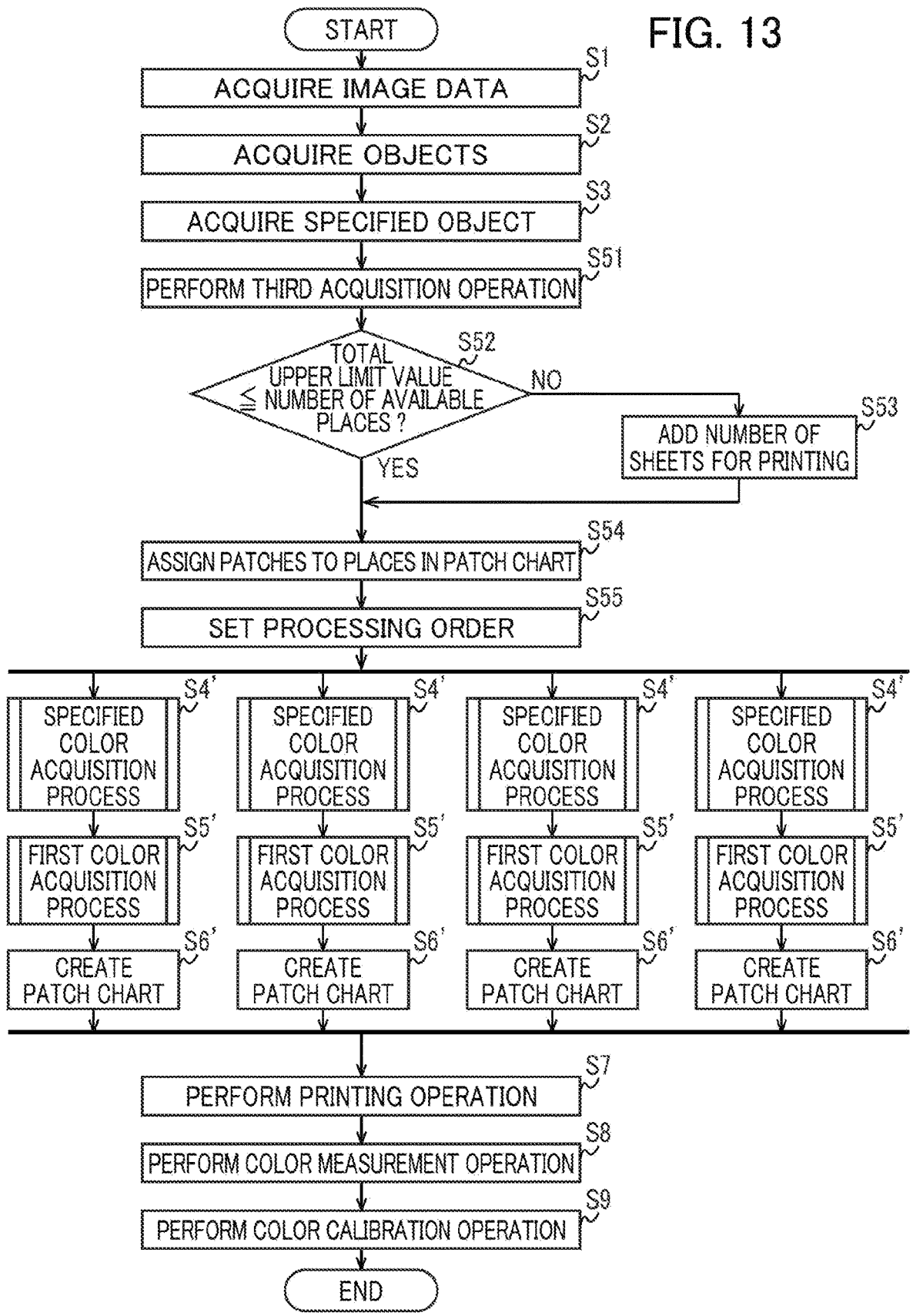
FIG. 13 is a flowchart illustrating steps in another example of the method of controlling the printing device that is executed by the control unit of the printing device.

FIG. 13 is a flowchart illustrating steps in an example of a method of controlling the printing device 10 in the second embodiment that is executed by the control unit 11. In this flowchart, the control unit 11 performs the process in steps S4' through S6' in place of steps S4 through S6 in the flowchart of FIG. 7. Additionally, steps S51 through S55 are executed between steps S3 and S4'.

In S1 of the flowchart in FIG. 13, the control unit 11 acquires image data representing the printing target image C from the external device B. In S2 the control unit 11 performs well-known image processes on the image data representing the printing target image C to acquire the objects in the printing target image C and their types. In S3 the control unit 11 acquires objects specified through the input unit 16 as specified objects.

In S51 the control unit 11 performs the third acquisition operation. In the third acquisition operation, the control unit 11 acquires the upper limit value of first patches D1 on the basis of the types of the specified objects acquired in S3. Correspondence relationship between these types of specified objects and upper limit value of first patches D1 are stored in the storage unit 12 in advance. The upper limit value of first patches D1 increases in the order of first object C1, second object C2, and third object C3. For example, the upper limit value for first patches D1 is one for a first object C1, five for a second object C2, and thirty for a third object C3.

Next, the control unit 11 calculates a total upper limit value by taking the sum of upper limit values of first patches D1 for all specified objects in the printing target image C. In the example of FIG. 6, one first object C1, one second object C2, and two third objects C3 in the printing target image C have been inputted as specified objects. In this case, the upper limit value of first patches D1 for the single first object C1 is 1; the upper limit value of first patches D1 for the single second object C2 is 5; and the upper limit value of first patches D1 for the two third objects C3 is 30×2=60. Thus, the total upper limit value of first patches D1, i.e., the total upper limit for the number of first patches D1 is 66.

In S52 the control unit 11 compares the total upper limit value of first patches D1 to the number of available places for first patches D1 in the patch chart D. The number of available places for first patches D1 is the number of first patches D1 that can be arranged in a patch chart D on a prescribed number of sheets (e.g., one sheet) of print media A. When the total upper limit value of first patches D1 is greater than the number of available places (S52: NO), in S53 the control unit 11 adds a number of sheets for printing that is a number of sheets of print media A on which the patch chart D is to be printed so that the total upper limit value of first patches D1 is no greater than the number of available places.

After the number of sheets for printing is added in S53 or when the total upper limit value of first patches D1 is determined to be less than or equal to the number of available places (S52: YES), in S54 the control unit 11 assigns the first patches D1 for the first object C1, the first patches D1 for the second object C2, and the first patches D1 for the two third objects C3 to places in the patch chart D. Here, the control unit 11 may assign the places for first patches D1 so that the number of patches for each sheet of print media A is less than the number of available places for first patches D1 on each sheet of print media A and so that each of the plurality of sheets of print media A has an equal or near equal number of patches.

When a patch chart D for the printing target image C in the example of FIG. 6 is to be printed on two sheets of print media A, for example, the control unit 11 assigns the 30 first patches D1 for the first third object C3 to the first sheet of print media A and assigns the 30 first patches D1 for the second third object C3, the 5 first patches D1 for the second object C2, and the 1 first patch D1 for the first object C1 to the second sheet of print media A.

In S55 the control unit 11 sets a processing order in accordance with the arrangement of the patches on the print media A. For example, the control unit 11 performs a process for patches arranged on the first sheet of the print media A and a process for patches arranged on the second sheet of the print media A in parallel.

In the example of FIG. 6, the first patches D1 for the first third object C3 and the second patches D2 are arranged on the first sheet of print media A. Hence, the control unit 11 sets the processing order in steps S4' through S6' for first patches D1 and second patches D2 according to the arrangement order of the first patches D1 and second patches D2 on the first sheet of print media A. Further, the control unit 11 arranges first patches D1 for the second third object C3, first patches D1 for the second object C2, and first patches D1 for the first object C1 on the second sheet of print media A. Accordingly, the control unit 11 sets the processing order in steps S4' through S6' for first patches D1 for the second third object C3, first patches D1 for the second object C2, and first patches D1 for the first object C1 on the second sheet of print media A. By performing processes in parallel for patches to be placed on a plurality of sheets of print media A in this way, the control unit 11 can shorten the processing time.

In S4' the control unit 11 acquires the specified colors in the first object C1, which is a specified object. The control unit 11 acquires these specified colors according to the flowchart in the example of FIG. 8. The process in S4' is executed for the specified objects arranged on each sheet of the print media A. By performing the process in steps S11 through S19 of FIG. 8, the control unit 11 acquires a specified color list associating specified colors in the specified objects on each sheet of the printing media A with their importance levels.

Figure 14:
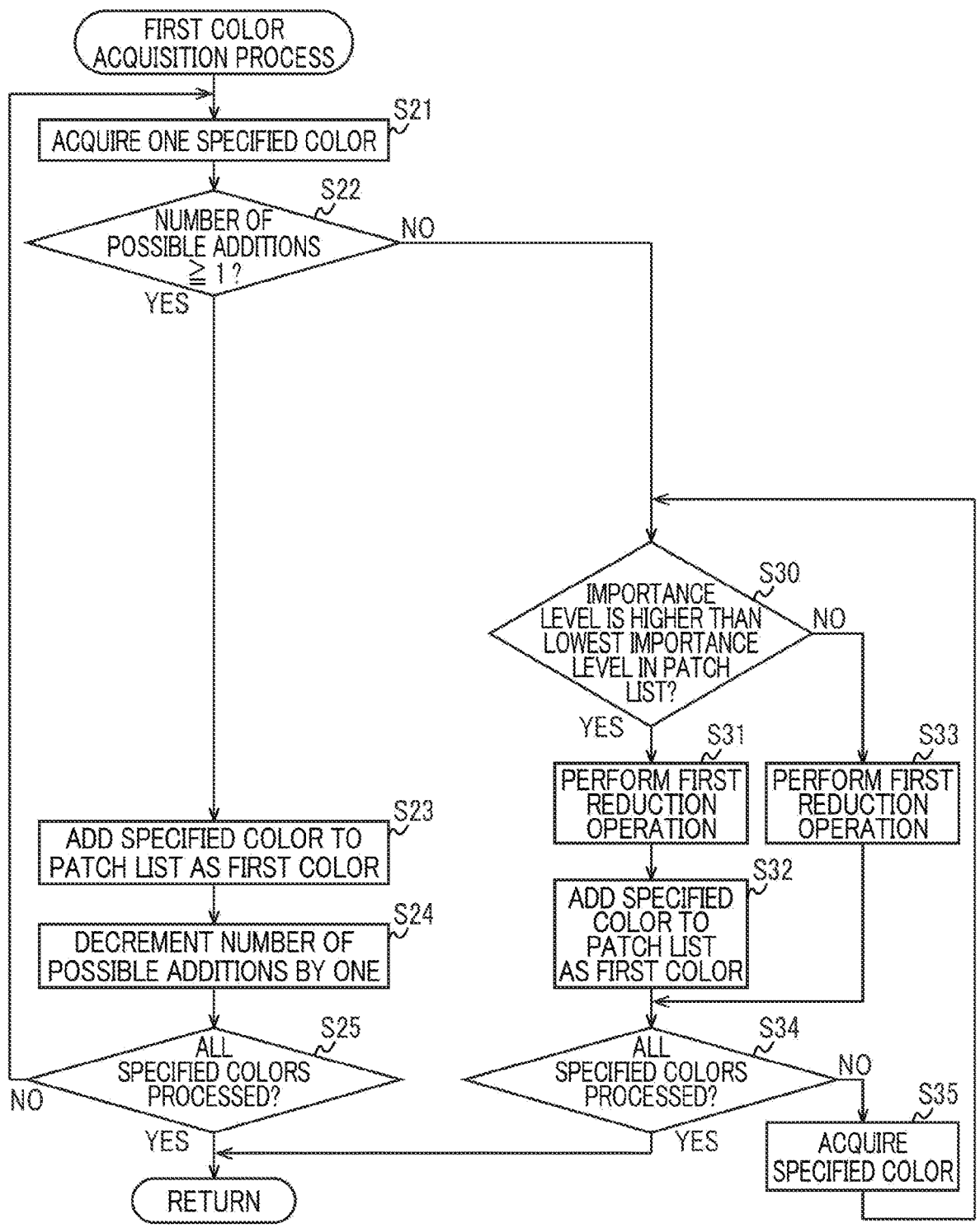
FIG. 14 is a flowchart illustrating steps in an example of a first color acquisition process executed in the process illustrated in FIG. 13.
Figure 15:
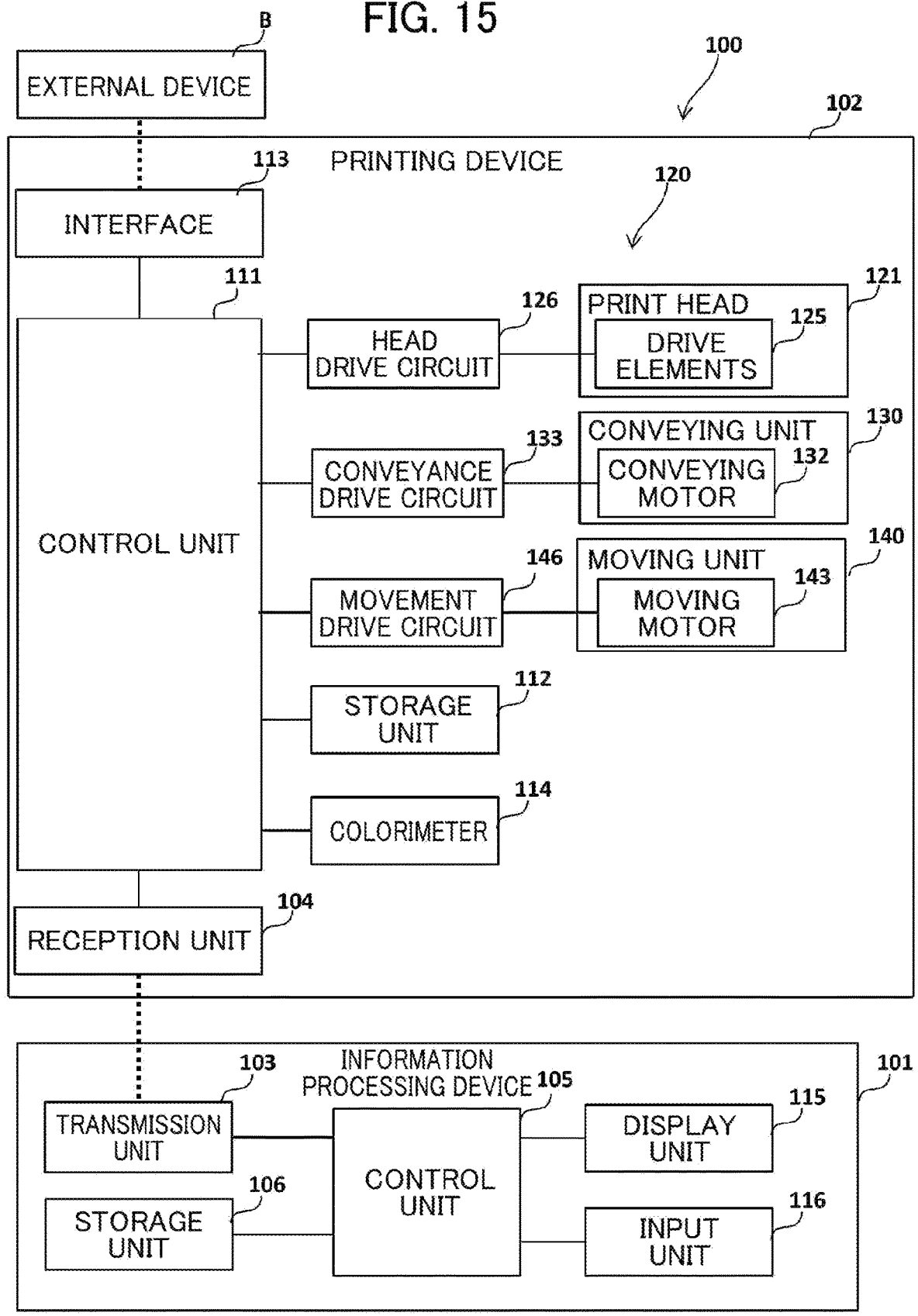
FIG. 15 is a block diagram illustrating the functional configuration of a printing system including a printing device and an information processing device.

In S5' the control unit 11 acquires the first colors of first patches D1 from the specified colors in the specified objects on each sheet of the printing media A acquired in S4' of FIG. 13. The control unit 11 acquires these first colors according to the flowchart illustrated in the example of FIG. 14. Here, since the upper limit value of first patches D1 has been acquired in the third acquisition operation, steps S26 through S29 in the flowchart of FIG. 9 related to the number of possible additions for first colors corresponding to this upper limit value have been omitted from the flowchart in FIG. 14. Further, the initial number of possible additions in the process of S22 is the upper limit value of first patches D1 acquired in the third acquisition operation. Hence, by performing the process in S21 through S25 and S30 through S35 of FIG. 14, the control unit 11 acquires a patch list of first colors for first patches D1 arranged on each sheet of the printing media A.

In S6' the control unit 11 creates a patch chart D based on the first colors acquired in S5'. Here, the control unit 11 generates image data representing a patch chart D in order to arrange first patches D1 of first colors for the first third object C3 acquired in S5' and second patches D2 acquired from the storage unit 12 in the patch chart D arranged on the first sheet of print media A. The control unit 11 also generates image data of a patch chart D for arranging first patches D1 of first colors for the second third object C3, first patches D1 of first colors for the second object C2, and first patches D1 of first colors for the first object C1 acquired in S5' in the patch chart D arranged on the second sheet of print media A.

The control unit 11 may also arrange first patches D1 for each object in the patch chart D in order of importance levels for the first colors. For example, in a case where 30 first patches D1 for one third object C3 and 5 first patches D1 for the second object C2 are arranged on the second sheet of print media A, these 30 first patches D1 for the third object C3 may be arranged in order of importance level, and the 5 first patches D1 for the second object C2 may be arranged in the order of importance level.

In S7 the control unit 11 performs a printing operation to print the patch chart D on the print media A on the basis of the image data representing the patch chart D. In S8 the control unit 11 performs a color measurement operation to control the colorimeter 14 to measure the colors of the first patches D1 and second patches D2 in the patch chart D printed on the print media A. In S9 the control unit 11 performs a color calibration operation to make color calibration on the conversion table on the basis of the colorimetric values for the first patches D1 and second patches D2. In this way, when the user specifies objects, the control unit 11 performs color calibration on the basis of the specified colors in these specified objects, thereby performing color calibration suited to the user's intention more appropriately. Furthermore, by using the upper limits for the number of first patches D1 for objects, the control unit 11 performs processes on a plurality of specified objects arranged on a plurality of sheets of print media A in parallel for each sheet, thereby improving processing speed.

Note that the printing device 10 according to the second embodiment may perform the second reduction operation described in the first variation. The printing device 10 according to the second embodiment may also perform the third reduction operation described in the second variation.

As illustrated in the example of FIG. 16, a printing system 100 according to a third embodiment is provided with an information processing device 101 and a printing device 102. The information processing device 101 is provided with a display unit 115 for displaying a printing target image C that includes a plurality of objects, an input unit 116 with which the user can specifies objects from among a plurality of objects in the printing target image C displayed on the display unit 115, and a transmission unit 103 for transmitting information on the specified objects inputted on the input unit 116 to the printing device 102. The printing device 102 is provided with a printing engine 120 that prints the printing target image C on print media A, a reception unit 104 that receives information on specified objects from the transmission unit 103, and a control unit 111. The control unit 111 performs a printing operation to print a patch chart D including first patches for specified colors in the specified objects and second patches D2 for predetermined colors on print media A with the printing engine 120.

The information processing device 101 is a personal computer, for example. In addition to the display unit 115, input unit 116, and transmission unit 103, the information processing device 101 has a control unit 105 and a storage unit 106. The control unit 105 includes a CPU or other processor that controls the display unit 115, input unit 116, and transmission unit 103 by executing programs stored in the storage unit 106. The storage unit 106 is memory, such as ROM and RAM. The transmission unit 103 is an interface capable of transmitting information to the reception unit 104 via a network or the like. This transmission unit 103 has a reception function in addition to a transmission function.

In addition to the printing engine 120, reception unit 104, and control unit 111, the printing device 102 is provided with an interface 113, a storage unit 112, and a colorimeter 114. The reception unit 104 of the printing device 102 is an interface capable of receiving information from the transmission unit 103 of the information processing device 101 via a network or the like. This interface also has a transmission function in addition to the reception function. The reception unit 104 may be configured of the interface 113 that can communicate with an external device B.

The configurations of the control unit 111, storage unit 112, interface 113, colorimeter 114, display unit 115, input unit 116, and printing engine 120 in the printing system 100 of the present embodiment may be identical to or similar to the configurations of the control unit 11, storage unit 12, interface 13, colorimeter 14, display unit 15, input unit 16, and printing engine 20 in the printing device 10 of the first and second embodiments. Thus, these structures in the printing system 100 are expressed by reference numerals generated by adding "100" to the reference numerals of corresponding structures in the printing device 10. As with the printing device 10 in the first and second embodiments, the control unit 111 and control unit 105 of the printing system 100 execute control methods according to the flowcharts in FIGS. 7 through 11, 13, and 14.

Other Variations of the Embodiments

While an inkjet printer serves as an example of the printing device 10 in the embodiments described above, the printing device 10 may be another printer, such as a laser printer or a thermal printer. A laser printer is provided with a printing engine. The printing engine of a laser printer includes an image carrying body such as a photosensitive drum or a photosensitive belt, a charging unit that charges the image carrying body through contact or non-contact, an exposure unit that forms an electrostatic latent image on the charged image carrying body using a laser semiconductor or the like (known as "exposure"), a toner cartridge or developing cartridge that supplies toner to the image carrying body on which an electrostatic latent image has been formed, a transfer unit such as a transfer roller or a transfer belt that transfers the developed toner image from the image carrying body directly to a print medium, and a fixing unit such as a fixing roller or a fixing belt that thermally fixes the toner transferred onto the print medium. The laser printer is not limited to the direct tandem laser printer described above but may be an intermediate transfer laser printer. An intermediate transfer laser printer first transfers the developed toner image from the image carrying body onto an intermediate transfer belt before using the transfer unit to transfer the toner image from the intermediate transfer belt onto the print medium. A thermal printer is also provided with a printing engine. The printing engine of a thermal printer includes a thermal head, and an ink ribbon. The thermal head contacts the ink ribbon and transfers ink in the ink ribbon onto a print medium by generating heat in selective heating elements.

While the printing device 10 is a serial printer in the embodiment described above, the printing device 10 may be a line printer instead. In this case, the printing device 10 does not include the moving unit 40, and the length of the print head 20 in the left-right direction is longer than the length of the print medium A in the same direction.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

INDUSTRIAL APPLICABILITY

The present disclosure is useful as a printing device, a method of controlling a printing device, a non-transitory computer-readable storage medium storing a set of computer-readable instructions for controlling a printing device, and a printing system that can perform color calibration suited to the user's intention more appropriately.

What is claimed is:

1. A printing device comprising:
    a display configured to display a printing target image including a plurality of objects;
    a user interface configured to receive a selection of a specified object specified from among the plurality of objects in the printing target image displayed on the display;
    a printing engine configured to print the printing target image on a print medium using colorant in a plurality of colors including first-color colorant and second-color colorant, the plurality of colors including a first color and a second color, the first-color colorant being the colorant in the first color, the second-color colorant being the colorant in the second color; and
    a controller configured to perform:
        a printing operation to print a patch chart on at least one sheet of print media with the printing engine, the patch chart including a first patch for a specified color and a plurality of second patches for respective ones of a plurality of predetermined colors, the specified color being a color included in the specified object, the plurality of predetermined colors being different from each other,
    wherein the patch chart has a first patch area and a second patch area, the first patch being arranged in the first patch area, the plurality of second patches being arranged in the second patch area,
    wherein in the second patch area, the plurality of second patches is arranged in both a first direction and a second direction orthogonal to the first direction,
    wherein the first patch is printed using at least one of the first-color colorant and the second-color colorant, and
    wherein at least one of the plurality of second patches is printed using both the first-color colorant and the second-color colorant.

2. The printing device according to claim 1, further comprising:
    a storage unit configured to store information on the plurality of second patches.

3. The printing device according to claim 1, further comprising:
    a storage unit configured to store information on the specified color,
    wherein the controller is configured to further perform:
        a first acquisition operation to acquire an importance level defined for the specified color; and
        a storage operation to store the importance level in the storage unit in association with the specified color, and
    wherein when a plurality of specified objects including a plurality of specified colors are inputted through the user interface, the controller acquires a plurality of importance levels determined for respective ones of the plurality of specified colors in the first acquisition operation, each of the plurality of importance levels indicating importance of a corresponding one of the plurality of specified colors in the printing target image.

4. The printing device according to claim 3,
wherein the first patch comprises a plurality of first patches for respective ones of the plurality of specified colors, and
wherein the plurality of first patches is arranged in the first patch area of the patch chart in descending order of the plurality of importance levels defined for respective ones of the plurality of specified colors.

5. The printing device according to claim 4,
wherein the controller is configured to further perform:
a reception operation to receive through the user interface a number of sheets of the at least one sheet of print media to be used for printing the patch chart; and
a second acquisition operation to acquire a number of candidate places for the plurality of first patches on a basis of the number of sheets, the number of candidate places for the plurality of first patches indicating a number of the at plurality of first patches that can be placed in the patch chart.

6. The printing device according to claim 5,
wherein the controller is configured to further perform:
when a number of the plurality of specified colors is greater than the number of candidate places for the plurality of first patches, a first reduction operation to reduce the number of the plurality of specified colors by excluding a specific specified color from among the plurality of specified colors, the specific specified color corresponding to a lowest importance level among the plurality of importance levels.

7. The printing device according to claim 1,
wherein the first patch comprises a plurality of first patches for respective ones of a plurality of specified colors, and
wherein the controller is configured to further perform:
when the specified object contains a picture or a photograph, a reduction operation to reduce a number of the plurality of specified colors by performing a pixel reduction on the specified object and setting a color included in the specified object after the pixel reduction as each of the plurality of specified colors, the specified object being configured of a plurality of pixels, the pixel reduction on the specified object being to reduce a number of the plurality of pixels constituting the specified object.

8. The printing device according to claim 1, further comprising:
a storage unit configured to store a conversion table mapping a plurality of input values to respective ones of a plurality of output values,
wherein any two neighboring input values of the plurality of input values are spaced apart at a predetermined color difference in a predetermined color space,
wherein the first patch comprises a plurality of first patches for respective ones of a plurality of specified colors, and
wherein the controller is configured to further perform:
when the specified object contains a picture or a photograph, a reduction operation to reduce a number of the plurality of specified colors by excluding one or more specified colors from two or more specified colors of the plurality of specified colors in a case where the two or more specified colors are positioned between two neighboring input values of the plurality of input values, the one or more specified colors being specified colors other than a closest specified color among the two or more specified colors, the closest specified color being a specified color closest among the two or more specified colors to an intermediate value between the two neighboring input values.

9. The printing device according to claim 1,
wherein the plurality of objects includes a plurality of types of objects, the plurality of types of objects being different from each other,
wherein the first patch comprises a plurality of first patches for respective ones of a plurality of specified colors, and
wherein the controller is configured to further perform:
an acquisition operation to acquire an upper limit value of the plurality of first patches in the patch chart on a basis of a type of the specified object, the upper limit value of the plurality of first patches indicating an upper limit for a number of the plurality of first patches.

10. The printing device according to claim 9,
wherein the upper limit value of the plurality of first patches is set to a different value depending on the type of the specified object.

11. The printing device according to claim 10,
wherein the plurality of types of objects includes a first object and a second object, the first object containing a character, the second object containing a figure, and
wherein in the patch chart, the upper limit value of the plurality of first patches for the second object is greater than the upper limit value of the plurality of first patches for the first object.

12. The printing device according to claim 10,
wherein the plurality of types of objects includes a first object and a second object, the first object containing a figure, the second object containing a picture or a photograph, and
wherein in the patch chart, the upper limit value of the plurality of first patches for the second object is greater than the upper limit value of the plurality of first patches for the first object.

13. A method of controlling a printing device, the printing device
including: a display configured to display a printing target image including a plurality of objects; a user interface configured to receive a selection of a specified object specified from among the plurality of objects in the printing target image displayed on the display; a printing engine configured to print the printing target image on a print medium; and a storage unit, the method comprising:
a printing operation to print a patch chart on at least one sheet of print media with the printing engine, the patch chart including at least one first patch for at least one specified color and a second patch for a predetermined color, each of the at least one specified color being a color included in the specified object, the storage unit being configured to store information on the at least one specified color;
an acquisition operation to acquire an importance level defined for each of the at least one specified color; and
a storage operation to store the importance level in the storage unit in association with the each of the at least one specified color,
wherein when a plurality of specified objects including a plurality of specified colors are inputted through the user interface, a controller acquires a plurality of importance levels determined for respective ones of the plurality of specified colors in the acquisition operation, each of the plurality of importance levels indicating importance of a corresponding one of the plurality of specified colors in the printing target image.

14. A printing system comprising:
an information processing device; and
a printing device,
wherein the information processing device comprises:
   a display configured to display a printing target image including a plurality of objects;
   a user interface configured to receive a selection of a specified object specified from among the plurality of objects in the printing target image displayed on the display; and
   a first network interface configured to transmit information on the specified object inputted through the user interface,
wherein the printing device comprises:
   a second network interface configured to receive the information on the specified object transmitted from the first network interface;
   a printing engine configured to print the printing target image on a print medium;
   a storage unit; and
   a controller configured to perform:
   a printing operation to print a patch chart on at least one sheet of print media with the printing engine, the patch chart including at least one first patch for at least one specified color and a second patch for a predetermined color, each of the at least one specified color being a color included in the specified object, the storage unit being configured to store information on the at least one specified color;
   an acquisition operation to acquire an importance level defined for each of the at least one specified color; and
   a storage operation to store the importance level in the storage unit in association with the each of the at least one specified color, and
wherein when a plurality of specified objects including a plurality of specified colors are inputted through the user interface and information on the plurality of specified objects are received through the second network interface, the controller acquires a plurality of importance levels determined for respective ones of the plurality of specified colors in the acquisition operation, each of the plurality of importance levels indicating importance of a corresponding one of the plurality of specified colors in the printing target image.

15. A printing device comprising:
a display configured to display a printing target image including a plurality of objects;
a user interface configured to receive a selection of a specified object specified from among the plurality of objects in the printing target image displayed on the display;
a printing engine configured to print the printing target image on a print medium;
a storage unit; and
a controller configured to perform:
   a printing operation to print a patch chart on at least one sheet of print media with the printing engine, the patch chart including at least one first patch for at least one specified color and a second patch for a predetermined color, each of the at least one specified color being a color included in the specified object, the storage unit being configured to store information on the at least one specified color;
   an acquisition operation to acquire an importance level defined for each of the at least one specified color; and
   a storage operation to store the importance level in the storage unit in association with each of the at least one specified color, and
wherein when a plurality of specified objects including a plurality of specified colors are inputted through the user interface, the controller acquires a plurality of importance levels determined for respective ones of the plurality of specified colors in the acquisition operation, each of the plurality of importance levels indicating importance of a corresponding one of the plurality of specified colors in the printing target image.

* * * * *